United States Patent
Akanuma

(10) Patent No.: US 12,379,587 B2
(45) Date of Patent: Aug. 5, 2025

(54) LIGHT DEFLECTOR, IMAGE PROJECTION APPARATUS, LASER HEADLAMP, HEAD-MOUNTED DISPLAY, DISTANCE MEASUREMENT APPARATUS, AND MOBILE OBJECT

(71) Applicant: Goichi Akanuma, Kanagawa (JP)

(72) Inventor: Goichi Akanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 626 days.

(21) Appl. No.: 17/654,263

(22) Filed: Mar. 10, 2022

(65) Prior Publication Data
US 2022/0299755 A1 Sep. 22, 2022

(30) Foreign Application Priority Data
Mar. 22, 2021 (JP) .................................. 2021-047932

(51) Int. Cl.
*G02B 26/08* (2006.01)
*B60K 35/23* (2024.01)
*G02B 27/01* (2006.01)

(52) U.S. Cl.
CPC .......... *G02B 26/0833* (2013.01); *B60K 35/23* (2024.01); *G02B 2027/0154* (2013.01)

(58) Field of Classification Search
CPC ........ G02B 26/0833; G02B 2027/0154; B60K 35/23
See application file for complete search history.

(56) References Cited

U.S. PATENT DOCUMENTS

| | | |
|---|---|---|
| 6,177,667 B1 | 1/2001 | Fujita et al. |
| 2003/0234990 A1 | 12/2003 | Akanuma |
| 2008/0225363 A1 | 9/2008 | Saitoh et al. |
| 2014/0300942 A1* | 10/2014 | Van Lierop ........ G02B 26/0833 359/198.1 |
| 2016/0139404 A1 | 5/2016 | Akanuma |
| 2019/0285886 A1* | 9/2019 | Yamashiro ....... G03G 15/04072 |
| 2020/0183151 A1 | 6/2020 | Nanjyo et al. |
| 2021/0041687 A1 | 2/2021 | Yokota et al. |
| 2021/0058592 A1 | 2/2021 | Akanuma |
| 2021/0156964 A1* | 5/2021 | Akanuma .......... G02B 26/0858 |

(Continued)

FOREIGN PATENT DOCUMENTS

| | | |
|---|---|---|
| JP | 2008-257226 | 10/2008 |
| JP | 2008-310295 | 12/2008 |

(Continued)

OTHER PUBLICATIONS

Japanese Office Action for 2021-047932 mailed on Sep. 3, 2024.

*Primary Examiner* — George G. King
(74) *Attorney, Agent, or Firm* — IPUSA, PLLC

(57) ABSTRACT

A light deflector includes: a movable portion; a support having one end connected to the movable portion to elastically support the movable portion, the support including a support thick portion; a drive beam connected to the other end of the support to deform the support to cause the movable portion to oscillate about an oscillation axis; a connecting portion connecting the other end of the support to the drive beam, the connecting portion including a connecting thick portion; and a support frame supporting the drive beam via a fixing portion. The support thick portion and the connecting thick portion are connected to each other.

15 Claims, 29 Drawing Sheets

(56) References Cited

U.S. PATENT DOCUMENTS

2021/0157128 A1   5/2021   Akanuma
2021/0157129 A1   5/2021   Yoda et al.

FOREIGN PATENT DOCUMENTS

| JP | 2010-128116 | | 6/2010 |
|----|-------------|---|--------|
| JP | 2011095331 A | * | 5/2011 |
| JP | 2013-007779 | | 1/2013 |
| JP | 2020-148973 | | 9/2020 |

* cited by examiner

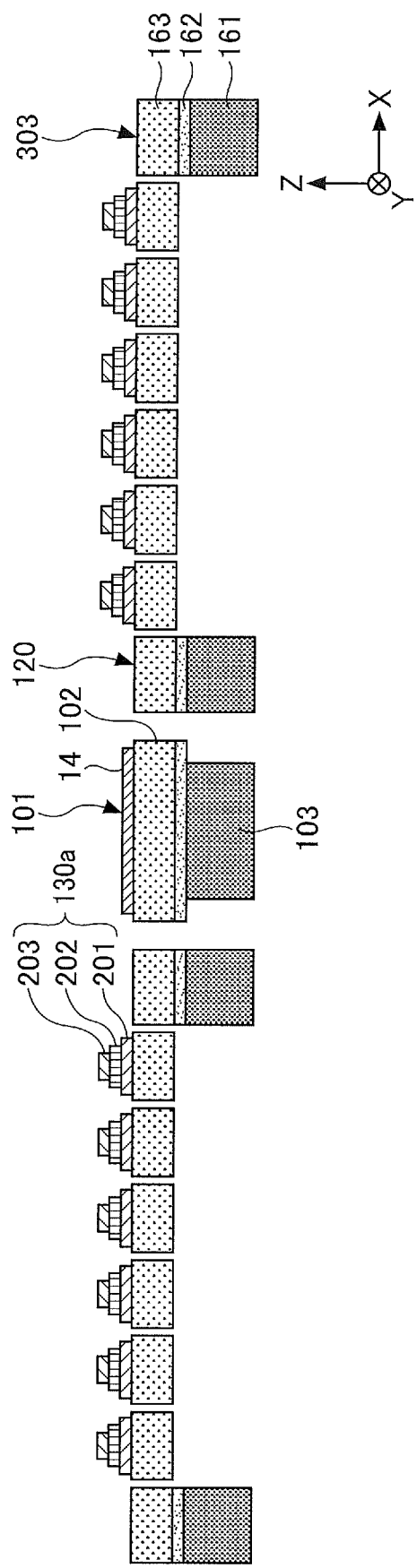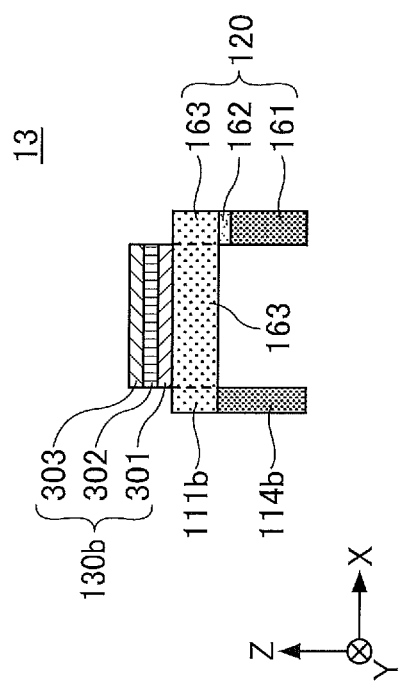

FIG. 16A
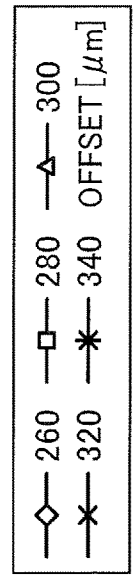
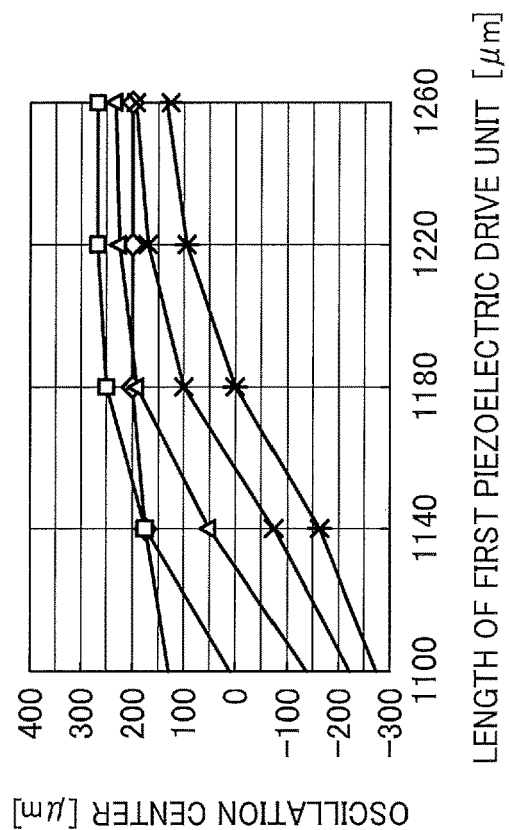
FIG. 16B
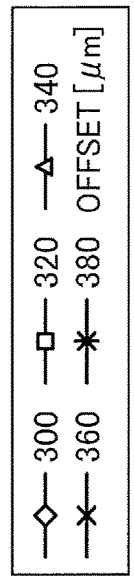
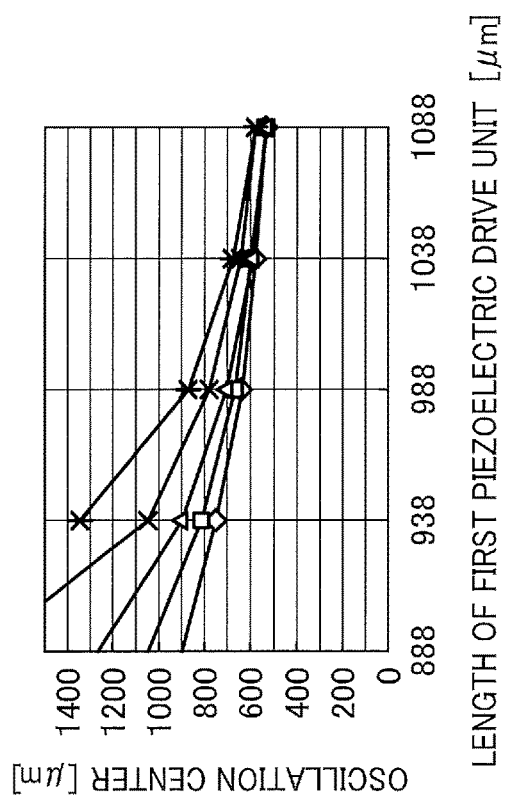

LIGHT DEFLECTOR, IMAGE PROJECTION APPARATUS, LASER HEADLAMP, HEAD-MOUNTED DISPLAY, DISTANCE MEASUREMENT APPARATUS, AND MOBILE OBJECT

CROSS-REFERENCE TO RELATED APPLICATIONS

This patent application is based on and claims priority pursuant to 35 U.S.C. § 119(a) to Japanese Patent Application No. 2021-047932, filed on Mar. 22, 2021, in the Japan Patent Office, the entire disclosure of which is hereby incorporated by reference herein.

BACKGROUND

Technical Field

Embodiments of the present disclosure relate to a light deflector, an image projection apparatus, a laser headlamp, a head-mounted display (HMD), a distance measurement device, and a mobile object.

Related Art

In recent years, with the development of micromachining technology applying semiconductor manufacturing technology, development of micro electro mechanical systems (MEMS) device manufactured by micromachining silicon or glass is advancing.

Some example MEMS devices include first and second actuators that cause a mirror as a movable portion to oscillate about the first axis and the second axis orthogonal to each other. Such MEMS devices control the first actuator to actuate the mirror to oscillate about the first-axis based on drive signals having frequency components close to the resonance frequency of the oscillation of the mirror, so as to perform horizontal scanning, or raster scanning with rays reflected from the mirror.

SUMMARY

An embodiment of the present disclosure provides a light deflector including: a movable portion; a support having one end connected to the movable portion to elastically support the movable portion, the support including a support thick portion; a drive beam connected to the other end of the support to deform the support to cause the movable portion to oscillate about an oscillation axis; and a connecting portion connecting the other end of the support to the drive beam, the connecting portion including a connecting thick portion; a support frame supporting the drive beam via a fixing portion. The support thick portion and the connecting thick portion are connected to each other.

Another embodiment of the present disclosure provides a light deflector comprising: a movable portion: a support having one end connected to the movable portion to support the movable portion; a drive beam connected to the other end of the support to deform the support to cause the movable portion to oscillate about an oscillation axis, the drive beam including a first drive thick portion and a second drive thick portion; a connecting portion connecting the other end of the support to the drive beam, the connecting portion including a connecting thick portion; and a support frame supporting the drive beam via a fixing portion. The first drive thick portion and the second drive thick portion extend in a direction perpendicular to the oscillation axis.

Still another embodiment of the present disclosure provides an image projection apparatus including: a light source unit to emit light; the above-described light deflector to deflect the light emitted from the light source; and an optical system to form an image with the light deflected by the light deflector to project the image.

Even another embodiment of the present disclosure provides a laser headlamp including: a light source to emit light; the above-described light deflector to deflect the light emitted from the light source; and a transparent plate having a surface covered with fluorescent material, the transparent plate to transmit the light deflected by the light deflector to convert the light transmitted through the transparent plate into white light and allow the white light to be emitted therefrom.

Yet another embodiment of the present disclosure provides a head-mounted display including: a light source to emit light; the above-described light deflector to deflect the light emitted from the light source; and a light guide plate to guide the light deflected by the light deflector; and a mirror to reflect the light guided by the light guide plate to eyes of a user wearing the head-mounted display to allow the user to observe an image formed with the light Further described a distance measurement apparatus including: a light source to emit light; the above-described light deflector to deflect the light emitted from the light source to irradiate an object with the deflected light;
a photosensor to receive light reflected from the object; and circuitry to obtain output based on the received light from the photosensor and calculate a distance to the object based on the output.

Still further, a mobile object includes the image projection apparatus, the laser headlamp, or the distance measurement apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a cross-sectional view of the movable device taken along a second-axis in FIG. 1;

FIG. 3 is a cross-sectional view of the movable device taken along line PP in FIG. 1;

FIGS. 16A and 16B are graphs of the relation between an offset, the length of the first piezoelectric drive units, and the position of the center of oscillation, FIG. 16A illustrating a comparative example in which the first piezoelectric drive units are provided with none of the drive thick portions, the first drive thick portions, and the second drive thick portions and FIG. 16B illustrating an embodiment in which the first piezoelectric drive units are provided with the drive thick portions, the first drive thick portions, and the second drive thick portions;

Figure 1:
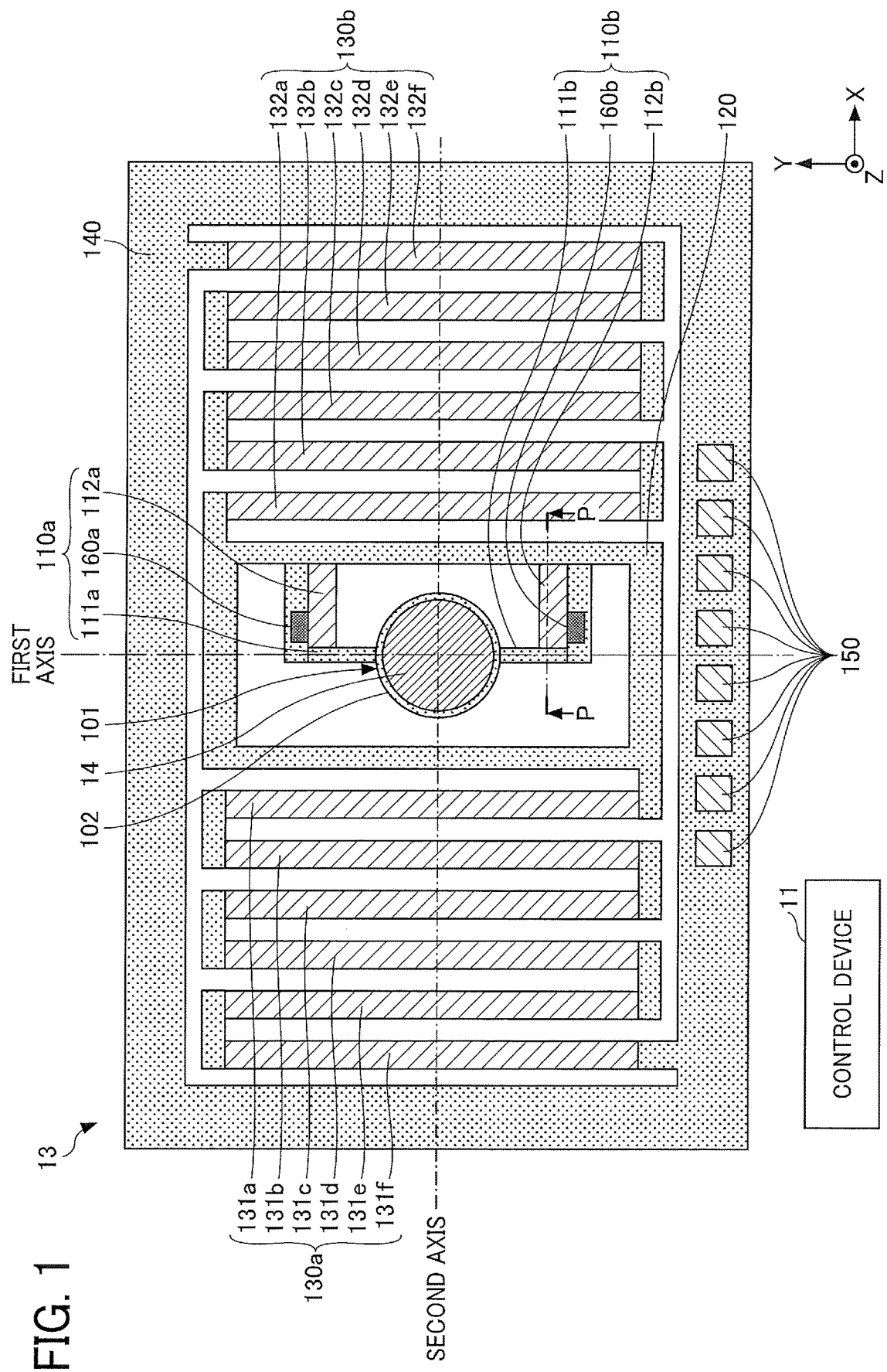
FIG. 1 is a plan view of a movable device according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

As used herein, the term "connected/coupled" includes both direct connections and connections in which there are one or more intermediate connecting elements.

Embodiments of the present disclosure prevent a decrease in resonance frequency due to upsizing of a movable portion.

Embodiments of the present disclosure are described in detail with reference to the drawings. Like reference signs are applied to identical or corresponding components throughout the drawings and redundant description thereof may be omitted.

In the description of the embodiments of the present disclosure, terms such as rotation, oscillation, and movement (movable) are synonymous. In the drawings, the Z direction is parallel to a direction in which layers are stacked in a piezoelectric drive circuit, and the X direction and the Y direction are orthogonal to each other within a plane perpendicular to the Z direction. Further, the "plan view" refers to a view of an object when viewed in the Z-direction.

In addition, a direction indicated by an arrow in the X-direction is referred to as a +X-direction, a direction opposite to the +X-direction is referred to as a −X-direction, a direction indicated by an arrow in the Y-direction is referred to as a +Y-direction, a direction opposite to the +Y-direction is referred to as a −Y-direction, a direction indicated by an arrow in the Z-direction is referred to as a +Z-direction, and a direction opposite to the +Z-direction is referred to as a −Z-direction. However, these directions do not limit the orientation of the light deflector device, and the light deflector is oriented in any desired direction.

Hereinafter, an embodiment will be described using the movable device as an example of a light deflector.

First Embodiment

The configuration of the movable device 13 according to the first embodiment will be described with reference to FIGS. 1 to 3. FIG. 1 is a plan view of the movable device 13. FIG. 2 is a cross-sectional view of the movable device taken along a second-axis in FIG. 1. FIG. 3 is a cross-sectional view of the movable device 13 taken along line PP in FIG. 1.

The movable device 13 in FIG. 1 has a mirror 101, first drive units 110a and 110b, a first support frame 120, second drive units 130a and 130b, a support frame 140, electrode connecting parts 150 and a control device 11.

The mirror 101 having a reflecting surface 14 is an example of a movable portion that reflects incident light. One end of each of the first drive units 110a and 110b is connected to the mirror 101 to rotate the mirror 101 around a first-axis parallel to the Y-axis. The first support frame 120 supports the mirror 101 and the first drive units 110a and 110b.

The first drive units 110a and 110b are connected to the first support frame 120 to rotate the mirror 101 and the first support frame 120 around a second-axis parallel to the X-axis. The second support frame 140 supports the second drive units 130a and 130b. The electrode connecting parts 150 are electrically connected to the first drive units 110a and 110b, the second drive units 130a and 130b, and the control device 11.

The movable device 13 includes, for example, one silicon on insulator (SOI) substrate that is formed by any appropriate treatment method, such as etching. On the formed SOI substrate, the reflecting surface 14, first piezoelectric drive units 112a, 112b, the second piezoelectric drive units 131a to 131f, and 132a to 132f, and the electrode connecting parts 150 are formed, which constitutes an integral structure of the above-described components. The above-described multiple components may be formed after the SOI substrate is molded, or may be formed while the SOI substrate is being molded.

As illustrated in FIG. 2, the SOI substrate, on which the movable device 13 is formed, includes a silicon supporting layer 161 containing single crystal silicon (Si), a silicon oxide layer 162 on the +Z-surface of the silicon supporting layer 161, a silicon active layer 163 containing single crystal Si on the silicon oxide layer 162. The silicon oxide layer 162 is referred to also as a buried oxide (BOX) layer.

The silicon active layer 163 has a smaller thickness in the Z-axis than the thickness along the X-axis or the Y-axis. With such a configuration, any member made of the silicon active layer 163 serves as an elastic member having elasticity.

The SOI substrate does not have to be planar, and may have, for example, a curvature. As long as the substrate can be integrally processed by etching or the like and can be partially elastic, the member used for forming the movable device 13 is not limited to the SOI substrate.

The mirror 101 includes, for example, a circular mirror base 102 and the reflecting surface 14 that is formed on the +Z surface of the mirror base 102. The mirror base 102 includes, for example, a silicon active layer 163. The reflecting surface 14 includes a thin metal film containing aluminum (Al), gold (Au), and silver (Ag).

The mirror 101 includes a movable thick portion 103 for strengthening the mirror on the −Z surface of the mirror base 102. The movable thick portion 103 includes, for example, the silicon supporting layer 161 and the silicon oxide layer 162 to prevent the distortion of the reflecting surface 14 due to the motion.

As illustrated in FIG. 1, the first drive units 110a and 110b include torsion bars 111a and 111b, and first piezoelectric drive units 112a and 112b.

One end of each the torsion bars 111a and 111b is connected to the mirror 101. Each of the torsion bars 111a and 111b is an example of a support that extends along the first-axis to elastically support the mirror 101.

One end of each of the first piezoelectric drive units 112a and 112b is connected to a corresponding torsion bar of the torsion bars 111a and 111b to cause the mirror 101 to oscillate around the first-axis by deforming the corresponding torsion bar. The first-axis is an example of a predetermined oscillation axis. The other end of each of the first piezoelectric drive units 112a and 112b is connected to the inner peripheral portion of the first support frame 120. The first drive units 110a and 110b include detective piezoelectric elements 160a and 160b, respectively.

As illustrated in FIG. 3, the torsion bars 111a and 111b each includes a silicon active layer 163. The first piezoelectric drive units 112a and 112b each include the lower electrode 301, the piezoelectric unit 302, and the upper electrode 303, which are formed in that order on the +Z-surface of the silicon active layer 163 that serves as an elastic body. For example, each of the upper electrode 303 and the lower electrode 301 contains gold (Au) or platinum (Pt). For example, the piezoelectric portion 302 contains lead zirconate titanate (PZT) as a piezoelectric material.

As illustrated in FIGS. 1 to 3, the first support frame 120 is, for example, a rectangular support body surrounding the mirror 101, including the silicon support layer 161, the silicon oxide layer 162, and the silicon active layer 163.

The second drive units 130a and 130b includes multiple second piezoelectric drive units 131a to 131f and 132a to 132f, which are joined to turn. One end of each of the second drive units 130a and 130b is connected to the outer peripheral portion of the first support frame 120, and the other end of each of the second drive units 130a and 130b is connected to the inner peripheral portion of the second support frame 140.

The connecting portion at which the one end of the second drive unit 130a is connected to the first support frame 120 and the connecting portion at which the one end of the second drive unit 130b is connected to the first support frame 120 are point-symmetrical with respect to the center of the reflecting surface 14. The connecting portion at which the other end of the second drive unit 130a is connected to the second support frame 140 and the connecting portion at which the other end of the second drive unit 130b is connected to the second support frame 140 are point-symmetrical with respect to the center of the reflecting surface 14.

As illustrated in FIG. 2, the second drive units 130a and 130b each include the lower electrode 201, the piezoelectric unit 202, and the upper electrode 203, which are formed in that order on the +Z-surface of the silicon active layer 163 that serves as an elastic body. For example, each of the upper electrode 203 and the lower electrode 201 contains gold (Au) or platinum (Pt). For example, the piezoelectric unit 202 contains lead zirconate titanate (PZT) as a piezoelectric material.

As illustrated in FIGS. 1 and 2, the second support frame 140 includes the silicon supporting layer 161, the silicon oxide layer 162, and a silicon active layer 163. The second support frame 140 is a rectangular support body surrounding the mirror 101, the first drive units 110a and 110b, the first support frame 120, and the second drive units 130a and 130b.

The electrode connecting parts 150, which are formed on the +Z-surface of the second support frame 140, are electrically connected to the upper electrode 203 and the lower electrode 201 of each of the first piezoelectric drive units 112a and 112b and the second piezoelectric drive units 131a to 131f, and the control device 11 via electrode wiring of aluminum (Al). A signal voltage is applied to the lower electrode 201, and the upper electrode 203 is grounded (GND).

Each of the upper electrodes 203 and the lower electrodes 201 may be directly connected to the electrode connecting parts 150. Alternatively, in some embodiments, the upper electrodes 203 and the lower electrodes 201 may be indirectly connected to the electrode connecting parts 150 through a wire connecting a pair of electrodes.

Although this embodiment has illustrated an example in which the piezoelectric unit 202 is formed on a surface (+Z surface) of the silicon active layer 163 serving as the elastic member, the piezoelectric unit 202 may be formed on another surface (for example, −Z surface) of the elastic member, or on both the surface and the other surface of the elastic member.

The shapes of the components are not limited to the shapes in the embodiment as long as the mirror 101 can be driven around the first axis or the second axis. The torsion bars 111a and 111b, and the first piezoelectric drive units 112a and 112b may have shapes with curvatures.

Further, an insulating layer composed of the silicon oxide layer may be disposed on at least any one of the +Z-surfaces of the upper electrodes 303 of the first drive units 110a and 110b, the first support frame, the upper electrodes 203 of the second drive units 130a and 130b, and the second support frame 140.

In this case, electrode wiring is provided on the insulating layer, and the insulating layer is partially removed as an opening or is not formed at a connection spot where the upper electrode 203, the upper electrode 303, the lower electrode 201, or the lower electrode 301 and the electrode wiring are connected. This configuration increases the degree of flexibility in design of the first drive units 110a and 110b, the second drive units 130a and 130b, and the electrode wiring and also prevents short circuiting due to the electrodes contacting each other. The silicon oxide film also serves as an anti-reflection member.

Further, the detective piezoelectric element 160a for detecting elastic deformation of the first drive unit 110a is close to the first piezoelectric drive unit 112a. The detective piezoelectric element 160b for detecting elastic deformation of the first drive unit 110b is close to the first piezoelectric drive unit 112b.

The first piezoelectric drive unit 112a, which is provided in the first drive unit 110a, deforms the first drive unit 110a in response to an applied driving voltage. The first piezoelectric drive unit 112b, which is provided in the first drive unit 110b, deforms the first drive unit 110b in response to an applied driving voltage.

The detective piezoelectric element 160a generates detection signals in response to the deformation of the first drive unit 110a (i.e., the piezoelectric effects), and outputs the detection signals to the control device 11 via the electrode connecting parts 150. The detective piezoelectric element 160b generates detection signals in response to the deformation of the first drive unit 110b (i.e., the piezoelectric effects), and outputs the detection signals to the control device 11 via the electrode connecting parts 150.

Next, the control by the control device 11 that drives the drive units 110a and 110b of the movable device 1 is described in detail.

Each of the piezoelectric unit 302 included in the first drive units 110a and 110b and the piezoelectric unit 202 included in the second drive units 130a and 130b deforms (for example, expands and contracts) according to the electrical potential of the applied voltage that is positive or negative in the direction of polarization. In other words, the inverse piezoelectric effects occur. The first drive units 110a and 110b and the second drive units 130a and 130b move the mirror 101 using the above-described inverse piezoelectric effects.

In this case, the angle defined by the reflecting surface 14 of the mirror 101 with respect to the XY plane when the reflecting surface 14 is inclined to the +Z-direction or −Z-direction with respect to the XY plane is referred to as oscillation angle. Note also that the +Z-direction is referred to as a positive oscillation angle and the −Z-direction is referred to as a negative oscillation angle.

In the first drive units 110a and 110b, when a driving voltage is applied in parallel to the piezoelectric unit 302 of the piezoelectric drive units 112a and 112b through the upper electrode 303 and the lower electrode 301, the piezoelectric unit 302 is deformed.

With such deformation of the piezoelectric unit 302, the first piezoelectric drive units 112a and 112b bend and deform, which causes the torsion bars 111a and 111b to be twisted. As a result, a driving force around the first-axis acts on the mirror 101 via the twisting of the two torsion bars 111a and 111b, and the mirror 101 oscillates around the first-axis. The drive voltages applied to the first drive units 110a and 110b are controlled by the control device 11.

For example, the control device 11 applies a driving voltage with a predetermined sine waveform to the first piezoelectric drive units 112a and 112b of the first drive units 110a and 110b, and thus causes the mirror 101 to rotate around the first-axis in a cycle of a predetermined sine waveform of the drive voltage.

For example, if the frequency of the sine-waveform voltage is set to about 20 kilohertz (kHz), which is substantially equal to a resonant frequency of the torsion bars 111a and 111b, by using mechanical resonance as a result of the torsion of the torsion bars 111a and 111b, the mirror 101 can be resonated at about 20 kHz.

The control device 11 controls the oscillation of the first drive units 110a and 110b based on information related to the oscillation of the first drive units 110a and 110b acquired based on the detection signals output from the detective piezoelectric elements 160a and 160b.

Modifications of First Embodiment

The movable device 13 in FIG. 1 according to the present embodiment has a cantilever structure in which the first piezoelectric drive units 112a and 112b extend from the torsion bars 111a and 111b in the +X-direction. However, the configuration of the movable device 13 is not limited to the configuration in FIG. 1 and may be any configuration that allows the piezoelectric unit 202 applied with drive voltage to cause the mirror 101 to oscillate. For example, the movable device may have a movable device of a both-end supported structure.

Figure 4:
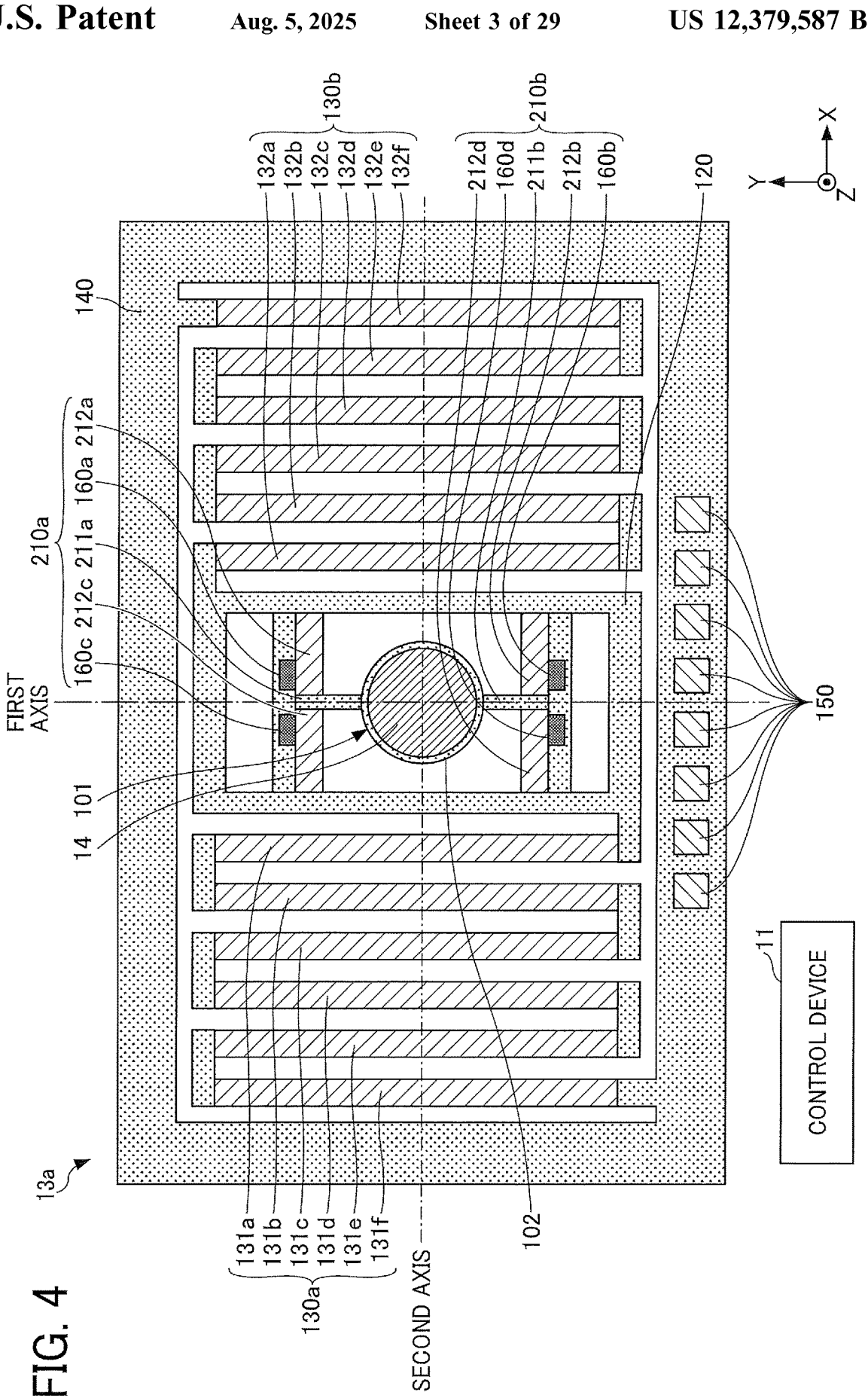
FIG. 4 is a plan view of a movable device according to a modification of the first embodiment.

FIG. 4 is a plan view of a movable device 13a according to a modification of the first embodiment. The same components as those of the movable device 13 are denoted by the same reference numerals, and redundant description thereof will be omitted. The movable device 13a in FIG. 4 includes first drive units 210a and a 210b.

The first drive unit 210a includes a torsion bar 211a, a first piezoelectric drive unit 212a extending from the torsion bar 211a in the +X-direction, and a first piezoelectric drive unit 212c extending from the torsion bar 211a in the −X-direction.

The first drive unit 210b includes a torsion bar 211b, a first piezoelectric drive unit 212b extending from the torsion bar 211b in the +X-direction, and a first piezoelectric drive unit 212d extending from the torsion bar 211b in the −X-direction.

Incorporating the movable device 13a of such a both-end-supported structure also exhibits the same advantageous effects as the configuration in FIG. 1.

Figure 5:
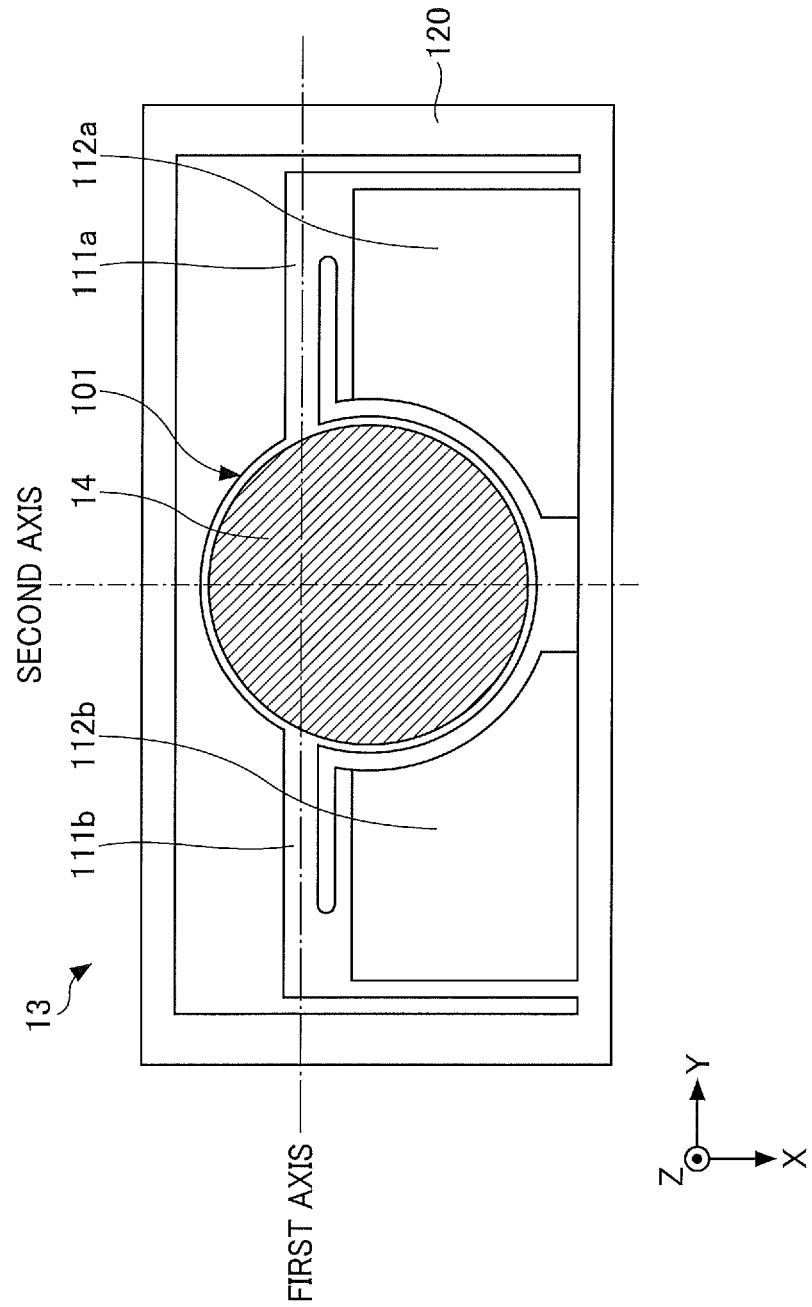
FIG. 5 is a top view of the configuration a torsion bar and its periphery.
Figure 6:
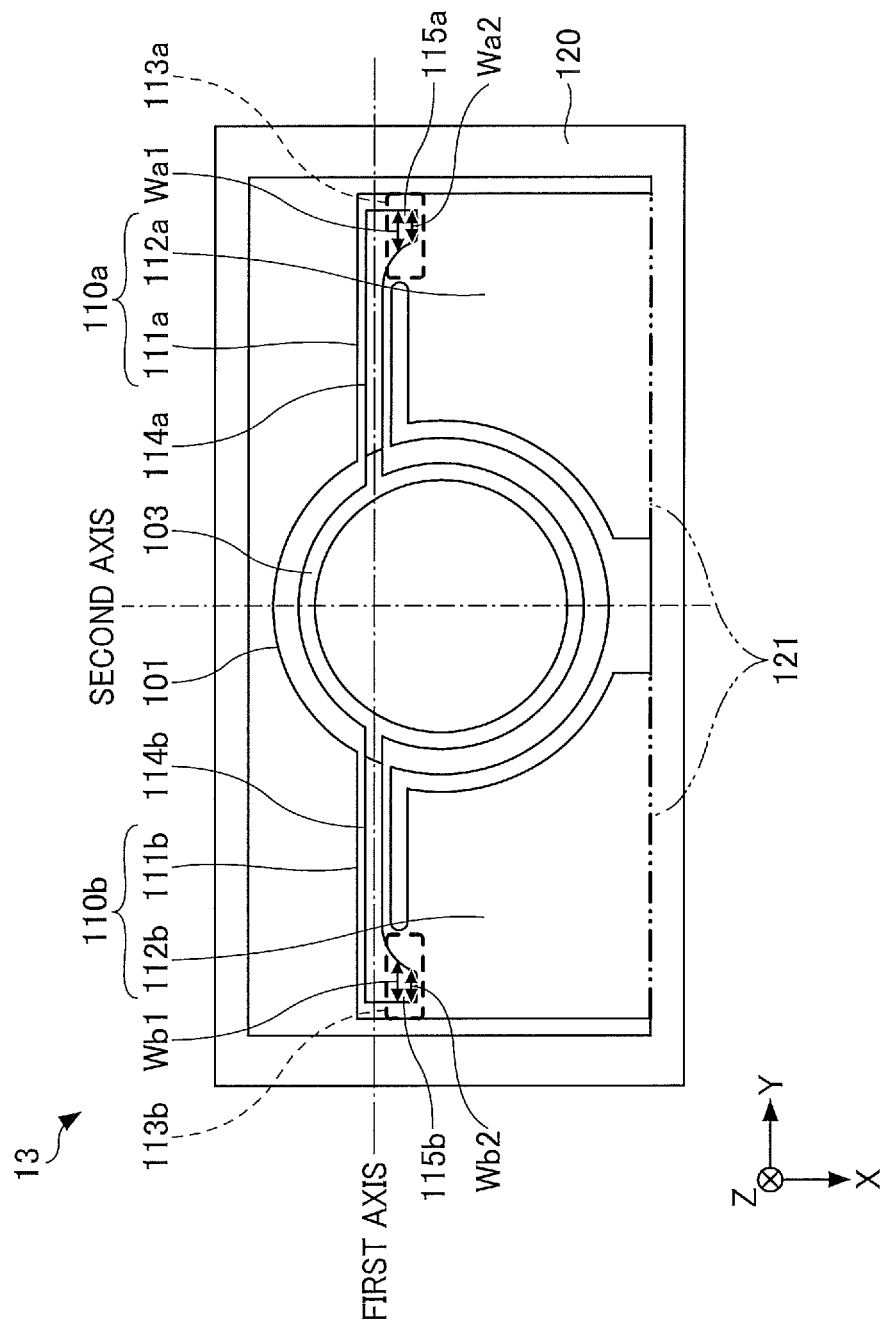
FIG. 6 is a bottom view of the configuration the torsion bar and its periphery.

Next, the configuration of the torsion bars 111a and 111b and their periphery is described in detail with reference to FIGS. 5 and 6. FIG. 5 is a top view of the configuration of the torsion bars 111a and 111b and their periphery, according to an embodiment when viewed in the +Z-direction. FIG. 6 is a bottom view of the configuration of the torsion bars 111a and 111b and their periphery, according to an embodiment when viewed in the −Z-direction.

As illustrated in FIGS. 5 and 6, one end of each of the torsion bars 111a and 111b is connected to a corresponding end of both ends of the mirror 101 in the Y-direction so as to elastically support the mirror 101. The other end of the torsion bar 111a is connected to one end of a first piezoelectric drive unit 112a via a connecting portion 113a. The other end of the torsion bar 111b is connected to one end of a first piezoelectric drive unit 112b via a connecting portion 113b. The other end of each of the first piezoelectric drive units 112a and 112b is supported by the first support frame 120 via a fixing portion 121.

The mirror 101 oscillates at, for example, 20 kHz in response to the twisting of the torsion bars 111a and 111b. For example, the reflecting surface 14 has a diameter of 1 mm, the silicon active layer 163 has a thickness of approximately 50 μm, and the torsion bars 111a and 111b have a width of approximately 50 μm in the X-direction. The aspect ratio (a ratio of width to thickness) of the cross section of each of the torsion bars 111a and 111b is preferably approximately 1.

As illustrated in FIG. 6, a support thick portion 114a is provided on the −Z-surface (hereinafter, referred to as the lower surface) of the torsion bar 111a. A support thick portion 114b is provided on the lower surface of the torsion bar 111b. The support thick portions 114a and 114b are composed of the silicon support layer 161 formed on the lower surface of the silicon active layer 163 in the torsion bars 111a and 111b. In the torsion bars 111a and 111b, the portions provided with the support thick portions 114a and 114b are thicker than portions composed only of the silicon active layer 163.

The width of the support thick portion 114a in the X-direction is slightly smaller than the width of the torsion bar 111a in the X-direction. This configuration allows for misalignment of the masks used to form the silicon active layer 163 and the silicon support layer 161 during manufacture of the movable device 13.

The movable thick portion 103 is formed on the lower surface of the mirror 101. The movable thick portion 103 is composed of the silicon support layer 161 formed on the lower surface of the silicon active layer 163 in the mirror 101. In the mirror 101, the portion provided with the movable thick portion 103 is thicker than portions composed only of the silicon active layer 163. The movable thick portion 103 serves as a reinforcing rib for reducing or eliminating the deformation of the mirror 101 to keep the reflecting surface 14 flat during the oscillation of the mirror 101.

Further, a connecting thick portion 115a is provided on the lower surface of the connecting portion 113a, and the connecting thick portion 115b is provided on the lower surface of the connecting portion 113b. The connecting thick portions 115a and 115b are composed of the silicon support layer 161 formed on the lower surface of the silicon active layer 163 in the connecting portions 113a and 113b. In the connecting portions 113a and 113b, the portions provided with the connecting thick portions 115a and 115b are thicker than portions composed only of the silicon active layer 163.

The movable thick portion 103 and the support thick portion 114a are continuous to each other, and the movable thick portion 103 and the support thick portion 114b are connected to each other. The support thick portion 114a and the connecting thick portion 115a are continuous to each other, and the support thick portion 114b and the connecting thick portion 115b are connected to each other. The phrase "connected to each other" for the portions is intended to mean that two portions are continuously formed to have substantially the same thickness.

Since the movable thick portion 103 and each of the support thick portions 114a and 114b are connected to each other, no abrupt change in thickness is observed between the movable thick portion 103 and each of the support thick portion 114a.

Similarly, since the support thick portion 114a and the connecting thick portion 115a are connected to each other, no abrupt change in thickness is observed between the support thick portion 114a and the connecting thick portion 115a. Further, since the support thick portion 114b and the connecting thick portion 115b are connected to each other, no abrupt change in thickness is observed between the support thick portion 114b and the connecting thick portion 115b.

This configuration reduces or eliminates stress caused by such an abrupt change in thickness between portions during the oscillation of the mirror 101.

Further, a width Wa1 (a first width) of a first portion of the connecting portion 113a along the first-axis is wider than a width Wa2 (a second width) of a second portion of the connecting portion 113a along the first-axis, the first portion being closer to the torsion bar 111a than the second portion. Similarly, a width Wb1 (a first width) of a first portion of the connecting portion 113b along the first-axis is wider than a width Wb2 (a second width) of a second portion of the connecting portion 113b along the first-axis, the first portion being closer to the torsion bar 111b than the second portion. With this configuration, the stiffness of the torsion bars 111a and 111b is increased.

Figure 7:
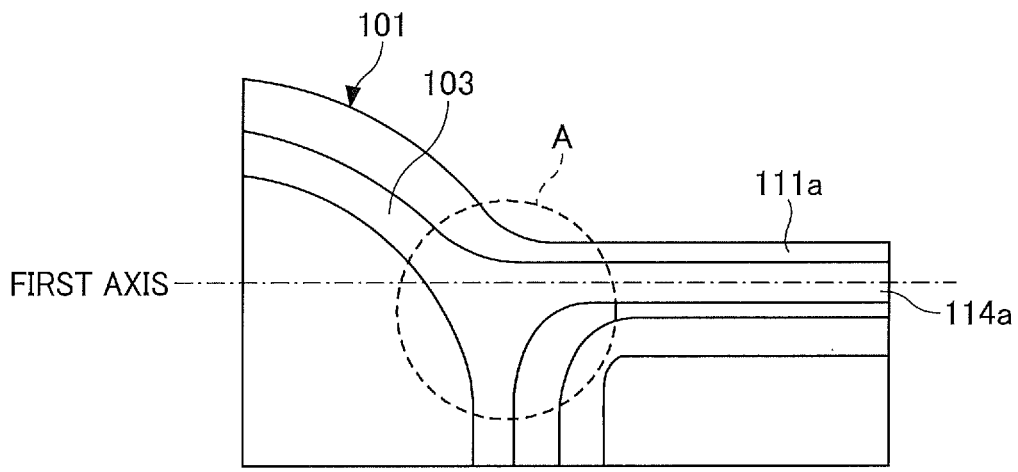
FIG. 7 is a diagram of the configuration for reducing or eliminating an abrupt change in shape.

In the portion where the thick portions are connected to each other, an abrupt change in shape between the thick portions is to be avoided. FIG. 7 is a diagram of the configuration for reducing or eliminating an abrupt change in the shape of a portion at which thick portions are connected. FIG. 7 is an enlarged view of a portion where the movable thick portion 103 and the support thick portion 114a are connected. As illustrated in a region A of FIG. 7, the movable thick portion 103 is connected to the support thick portion 114a to form an obtuse angle, which is not acute, to form a smooth shape.

The following describes advantageous effects of the movable device 13.

In a movable device including a support such as a torsion bar, the rotational stiffness of the support is to be increased to increase the oscillation frequency of a large mirror. In a typical movable device, a two-layer silicon wafer such as an SOI substrate is used. In a configuration of oscillation around two axes substantially perpendicular to each other, a support that causes oscillation around a first axis and second drive units such as the second drive units 130a and 130b that cause oscillation around a second axis have the same substrate thickness.

The support is to be thicker to increase the rotational stiffness of the support, whereas the second drive units are to be thinner to increase the drive sensitivity of the second drive units. In view of this, optimization of the thicknesses of the support and the second drive units may be difficult. The drive sensitivity refers to an oscillation angle per unit voltage.

Figure 8:
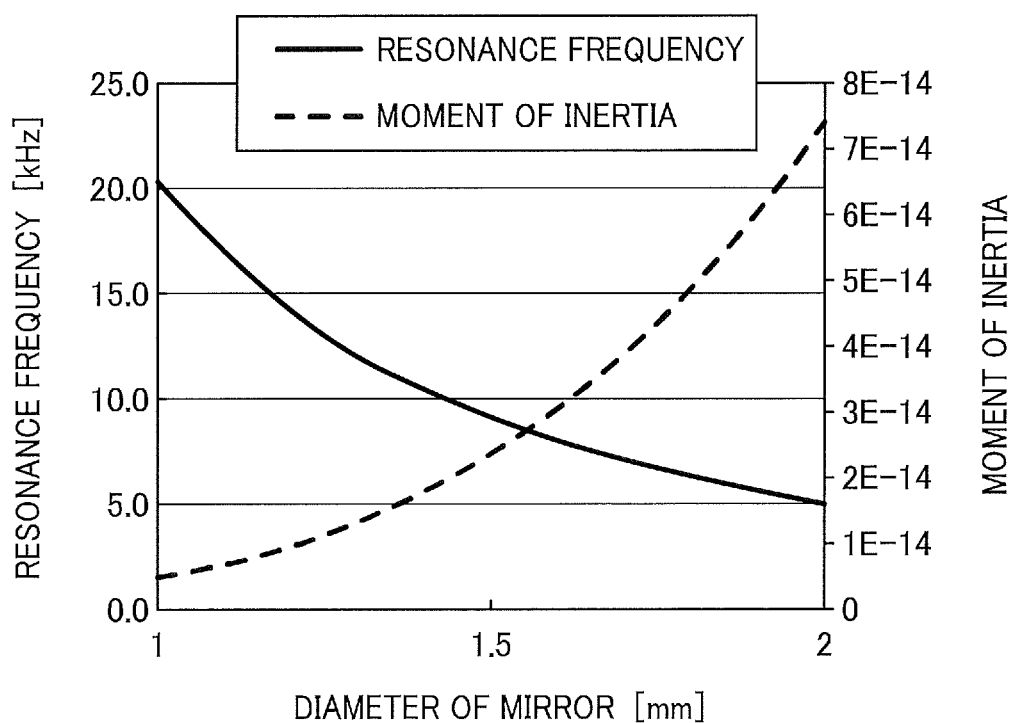
FIG. 8 is a graph of the relation between the diameter, moment of inertia, resonance frequency of the mirror.

FIG. 8 is a graph of the relation between the diameter, moment of inertia, resonance frequency of the mirror. As illustrated in FIG. 8, the moment of inertia increases rapidly as the mirror upsizes. When the torsional stiffness (rotational stiffness) of the torsion bar is constant, the resonance frequency decreases. To maintain a desired degree of resonance frequency, the torsional stiffness is to be increased in proportion to the moment of inertia.

In order to increase the torsional stiffness of the torsion bar, the width and thickness of the torsion bar may be increased and the length thereof may be reduced. However, such an increase in the thickness of the torsion bar involves increasing the thickness of the second drive units to increase the moment of inertia. This causes a decrease in both the resonance frequency and the drive sensitivity. Further, with a decrease in the length of the torsion bar, the torsional angle per unit length increases. This means that rotation with a small oscillation angle reaches a breaking stress, which causes a smaller angle limit of the mirror to reach a breaking point.

If the width of the torsion bar is increased to increase the angle limit to reach the breaking point, the width of the torsion bar may become larger than the diameter of the mirror depending on the diameter and resonance frequency of the mirror so that the layout may not be established. Even if the layout is established, the aspect ratio becomes very large.

Further, with an increase in the width of the torsion bar, the mirror is pulled at the connecting portion between the mirror and the torsion bar, and thus the deformation of the mirror surface increases. Further, with an increase in the aspect ratio of the cross section of the torsion bar, the breaking stress increases, and the nonlinearity between the oscillation angle and the drive voltage increases, thus causing an unstable behavior of the light deflector. For the cantilever structure, the moment due to offset is less likely to occur.

The movable device 13 according to an embodiment includes a mirror 101 (i.e., a movable portion) and torsion bars 111a and 111b (supports), one end of which is connected to the mirror 101 to support the mirror 101. The movable device 13 further includes the first piezoelectric drive units 112a and 112b (drive beams) each is connected to the other end of a corresponding torsion bar of the torsion bars 111a and 111b. The first piezoelectric drive units 112a and 112b deform the torsion bars 111a and 111b to cause the mirror 101 to oscillate about the first axis (a predetermined oscillation axis).

The movable device 13 further includes a connecting portion 113a that connects the torsion bar 111a to the first piezoelectric drive unit 112a, a connecting portion 113b that connects the torsion bar 111b to the first piezoelectric drive unit 112b, and a first support frame 120 (support frame) that supports the first piezoelectric drive units 112a and 112b via the fixing portion 121.

The torsion bar 111a is provided with a support thick portion 114a, and the torsion bar 111b is provided with a support thick portion 114b. The connecting portion 113a is provided with a connecting thick portion 115a, and the connecting portion 113b is provided with a connecting thick portion 115b. The support thick portion 114a and the connecting thick portion 115a are connected to each other, and the support thick portion 114b and the connecting thick portion 115b are connected to each other.

The support thick portions 114a and 114b on the torsion bars 111a and 111b enables an increase in the torsional stiffness (rotational stiffness) of the torsion bars 111a and 111b and allows a higher resonance frequency with a large mirror 101.

Further, the thickness of the torsion bars 111a and 111b is compensated for by the support thick portions 114a and 114b composed of the silicon support layer 161. This enables a thinner silicon active layer 163, and thus allows a higher drive sensitivity of the second drive units 130a and 130b.

The support thick portion 114a and the connecting thick portion 115a are connected to each other, and the support thick portion 114b and the connecting thick portion 115b are connected to each other. The movable thick portion 103 and each of the support thick portions 114a and 114b are connected to each other. This configuration reduces and prevents an abrupt change in the shape of a portion at which the thick portions are connected, and thus reduces or eliminates the stress concentration on such a portion. The reduction or elimination of the stress concentration allows a higher angle limit of the torsion bars 111a and 111b to reach the breaking point.

In the present embodiment, a width Wa1 (a first width) of a first portion of the connecting portion 113a along the first-axis is wider than a width Wa2 (a second width) of a second portion of the connecting portion 113a along the first-axis, the first portion being closer to the torsion bar 111a than the second portion. Similarly, a width Wb1 (a first width) of a first portion of the connecting portion 113b along the first-axis is wider than a width Wb2 (a second width) of a second portion of the connecting portion 113b along the first-axis, the first portion being closer to the torsion bar 111b than the second portion.

With this configuration, the stiffness of the torsion bars 111a and 111b is increased. This further increases the torsional stiffness of the torsion bars 111a and 111b, and reduces or prevents a decrease in the resonance frequency for the use of a larger mirror 101.

The silicon active layer 163 of the torsion bars 111a and 111b and the silicon support layer 161 are joined with the silicon oxide layer 162 therebetween. In this arrangement, the silicon active layer 163 and the silicon support layer 161 may become separated from each other due to the joining strength. To avoid such a separation, the width Wa1 is made larger than the width Wa2, and the width Wb1 is made larger than the width Wb2 to increase the joining strength, and thus prevent the separation between the silicon support layer 161 and the silicon active layer 163.

Modification

Figure 9:
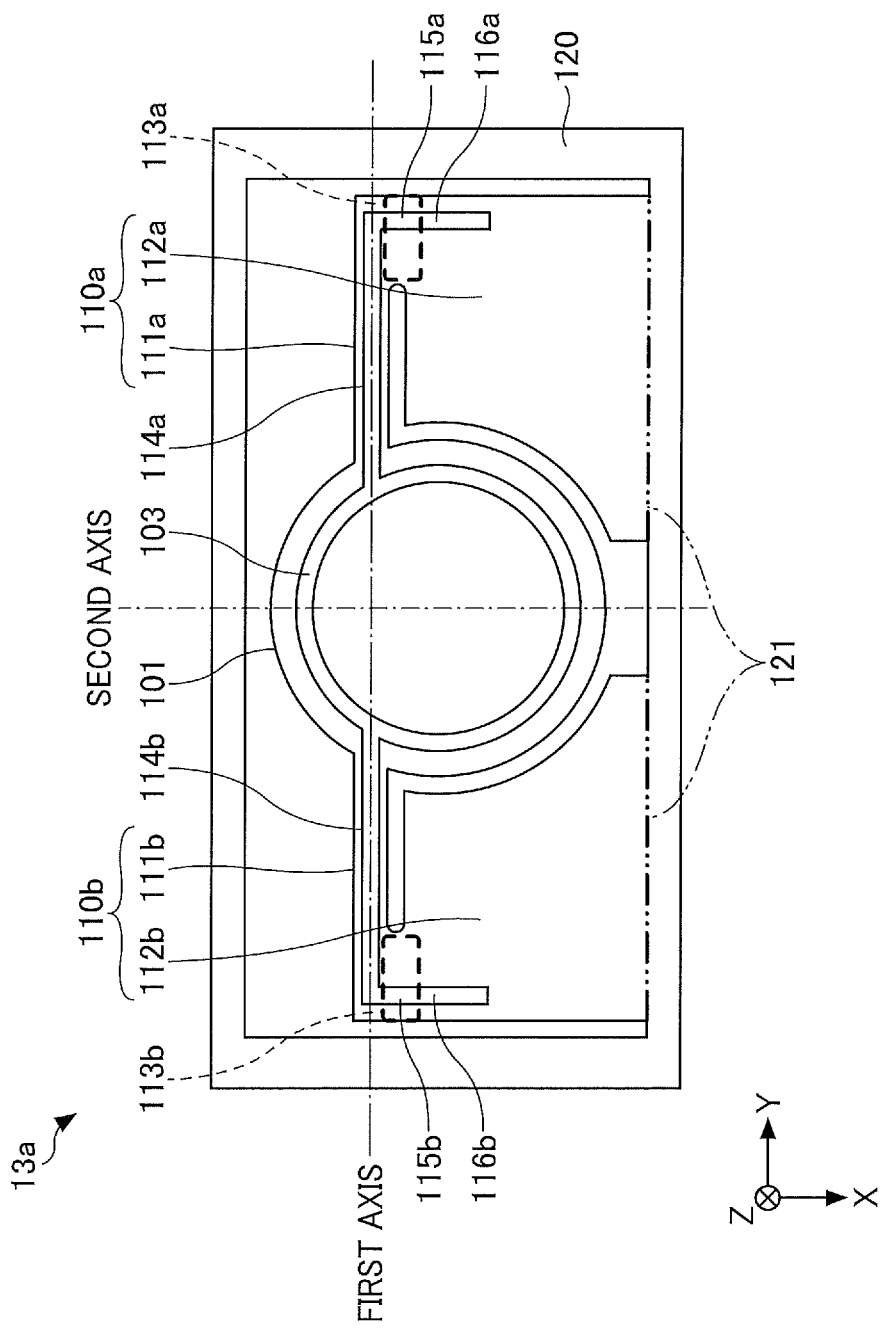
FIG. 9 is a bottom view of the vicinity of torsion bars of a movable device according to a first modification of an embodiment.

FIG. 9 is a bottom view of the vicinity of torsion bars 111a and 111b of a movable device 13a according to a first modification of an embodiment.

When a mirror 101 is large, and the oscillation angle of the mirror 101 increases in response to an increased resonance frequency, the connecting portions 113a and 113b may break.

To avoid such a situation, in the movable device 13a, the first piezoelectric drive unit 112a is provided with a drive thick portion 116a that is connected to the connecting thick portion 115a. The first piezoelectric drive unit 112b is provided with a drive thick portion 116b that is connected to the connecting thick portion 115b. The connecting thick portions 115a and 115b extend toward the fixing portion 121.

The drive thick portions 116a and 116b are composed of the silicon support layer 161 formed on the lower surface of the silicon active layer 163 in the first piezoelectric drive units 112a and 112b. In the first piezoelectric drive units 112a and 112b, the portions provided with the drive thick portions 116a and 116b are thicker than portions composed only of the silicon active layer 163.

This configuration enables an increase in the mechanical strength of the connecting portions 113a and 113b and thus prevent breakage in the connecting portion 113a. Further, the reduction or elimination of an abrupt change in the thickness between the drive thick portion 116b and the connecting thick portion 115b reduces or eliminates stress concentration and thus enables an increase in an angle limit to reach the breaking point.

The stiffness of the first piezoelectric drive units 112a and 112b is increased by providing the drive thick portions 116a and 116b extending along the direction (i.e., the direction substantially perpendicular to the first axis) in which the amount of deformation of the first piezoelectric drive units 112a and 112b changes during the oscillation. The increase in the stiffness of the first piezoelectric drive units 112a and 112b allows an increase in the resonance frequencies of the bending modes of the first piezoelectric drive units 112a and 112b to close to the resonance frequency of the mirror 101. This allows coupling of the bending mode of the first piezoelectric drive units 112a and 112b and the torsional mode of the mirror 101, thus increasing the drive sensitivity.

In the movable device 13a, the ends of the support thick portions 114a and 114b in the Y-direction are connected to the connecting thick portions 115a and 115b, which are extending toward the fixing portion 121 in the direction substantially perpendicular to the direction in which the support thick portions 114a and 114b extend. Such support thick portions 114a and 114b and connecting thick portions 115a and 115b form an L-shaped structure of the movable device 13a. However, this structure is only one example.

Alternatively, the connecting thick portions 115a and 115b are connected to portions of the support thick portions 114a and 114b, the portions being closer to the mirror 101 than the ends of the support thick portions 114a and 114b in the Y-direction. The connecting thick portions 115a and 115b extend toward the fixing portion 121 in the direction substantially perpendicular to the direction in which the support thick portions 114a and 114b extend. Such support thick portions 114a and 114b and connecting thick portions 115a and 115b form a T-shaped structure. The T-shaped structure more significantly increases the stiffness of the first piezoelectric drive units 112a and 112b and also reduces the resonance frequency further.

Figure 10:
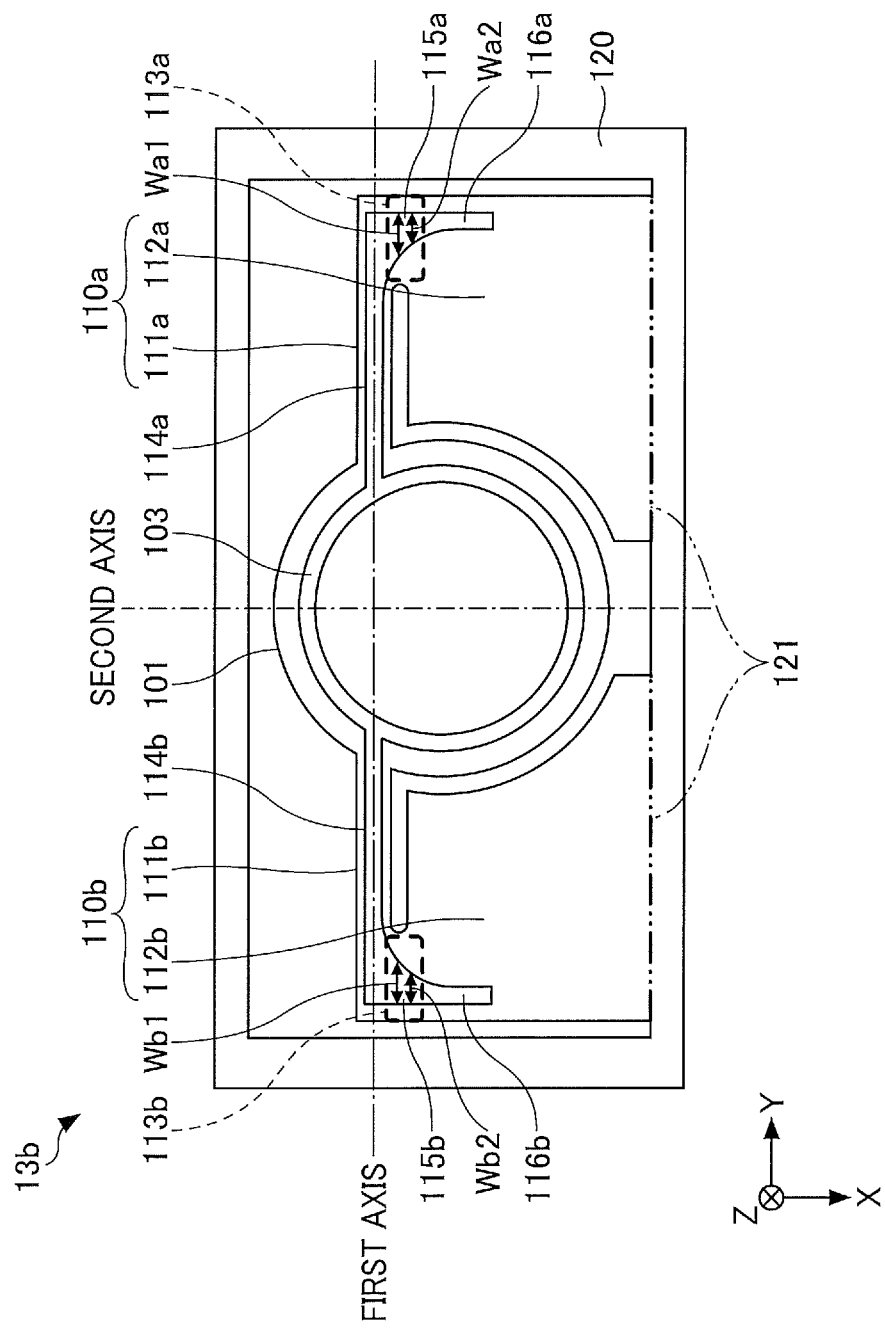
FIG. 10 is a bottom view of the vicinity of a torsion bar of a movable device according to a second modification of an embodiment.

FIG. 10 is a bottom view of the vicinity of torsion bars 111a and 111b of a movable device 13b according to a second modification of an embodiment.

In the movable device 13b, a width Wa1 (a first width) of a first portion of the connecting portion 113a along the first-axis is wider than a width Wa2 (a second width) of a second portion of the connecting portion 113a along the first-axis, the first portion being closer to the torsion bar 111a than the second portion. Similarly, a width Wb1 (a first width) of a first portion of the connecting portion 113b along the first-axis is wider than a width Wb2 (a second width) of a second portion of the connecting portion 113b along the first-axis, the first portion being closer to the torsion bar 111b than the second portion.

Such a configuration provided with the drive thick portions 116a and 116b also increases the torsional stiffness of the torsion bars 111a and 111b by making the width Wa1 wider than the width Wa2 and making Wb1 wider than the width Wb2. This configuration also prevents separation of the silicon support layer 161 and the silicon support layer 161 in the torsion bars 111a and 111b.

Second Embodiment

Next, a movable device 13c according to the second embodiment will be described. The same components as those of the first embodiment are denoted by the same reference numerals, and redundant description thereof will be omitted as appropriate.

The movable device 13c has a cantilever support structure that supports the torsion bars 111a and 111b in a cantilevered state. By offsetting the torsion center axes of the torsion bars 111a and 111b from the center of the mirror 101, the amplitudes of the first piezoelectric drive units 112a and 112b are converted into moments to cause the mirror 101 to oscillate.

Figure 11:
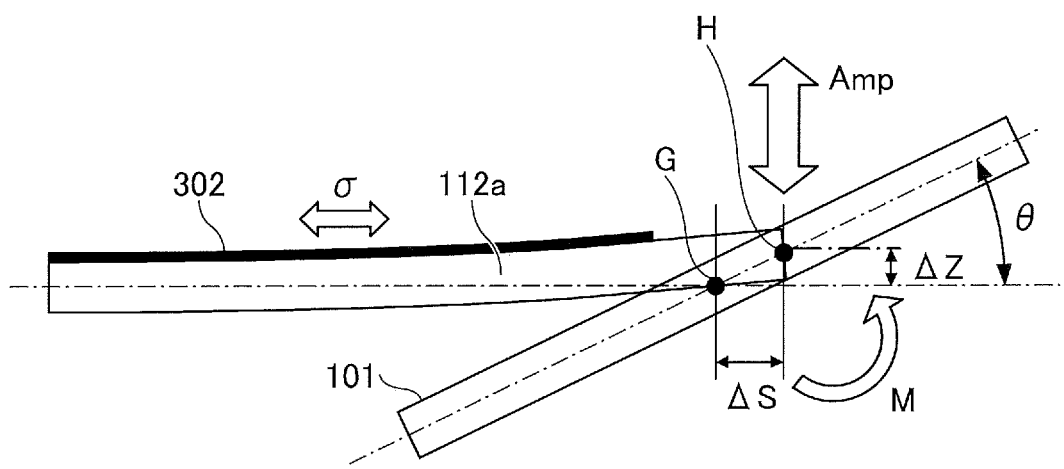
FIG. 11 is an illustration of an offset of the torsion center axis of the torsion bar from the center of a mirror.

FIG. 11 is an illustration of an offset of the torsion center axis of the torsion bar 111a from the center of the mirror 101. FIG. 11 indicates the center of gravity G of the mirror 101, the torsion center axis H of the torsion bar 111a, and an offset ΔS. When a voltage is applied to the piezoelectric unit 302, deformation occurs in the directions indicated by arrow G. This deformation causes the end portions of the first piezoelectric drive units 112a and 112b and the torsion bar to amplitude by ΔS in Amp direction. Thus, a moment M is generated, and the mirror 101 oscillates at an amplitude angle θ.

The resonance frequencies of the first piezoelectric drive units 112a and 112b in the bending mode are set to close to the resonance frequency of the mirror 101 in the oscillation mode (the resonance frequencies of the torsion bars 111a and 111b in the torsion mode) so as to increase the oscillation angle of the mirror 101 and thus achieve a larger oscillation angle with a lower drive voltage.

Figure 12B:
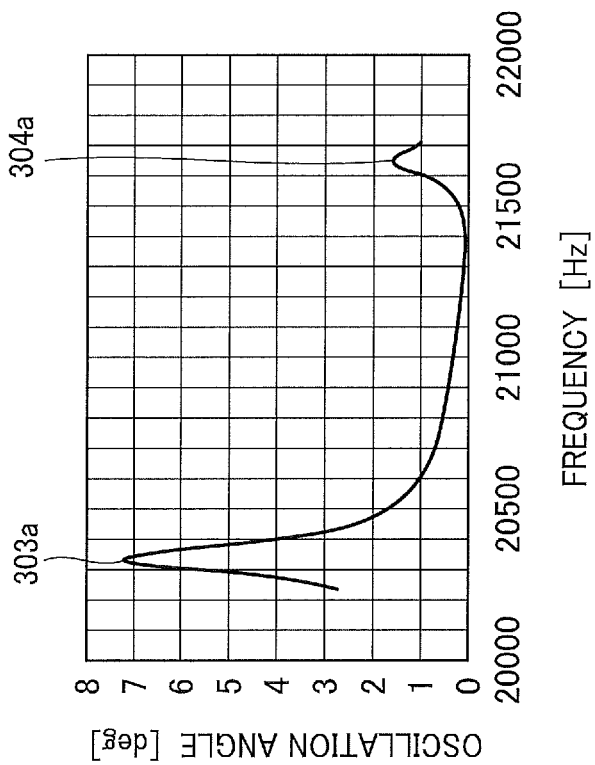
FIG. 12B is a graph of the relation between the frequency and the oscillation angle when the resonance frequency of the mirror is lower than the resonance frequencies of the first piezoelectric drive units.
Figure 12A:
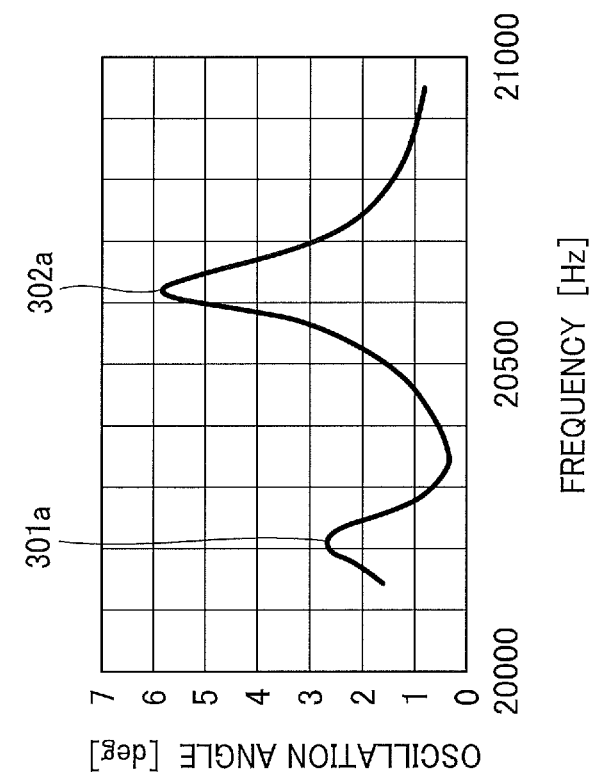
FIG. 12A is a graph of the relation between the frequency and the oscillation angle when the resonance frequency of the mirror is higher than the resonance frequencies of the first piezoelectric drive units.

FIGS. 12A and 12B are graphs of the relation between the frequency and the oscillation angle. FIG. 12A indicates a case in which the resonance frequency of the torsion bars 111a and 111b in the torsion mode is higher than the resonance frequencies of the first piezoelectric drive units 112a and 112b in the bending mode. FIG. 12B indicates a case in which the resonance frequency of the torsion bars 111a and 111b in the torsion mode is lower than the resonance frequencies of the first piezoelectric drive units 112a and 112b in the bending mode.

The graph in FIG. 12A indicates the resonance frequency 301a of the first piezoelectric drive units 112a and 112b in the bending mode and the resonance frequency 302a of the torsion bars 111a and 111b in the torsion mode. The graph in FIG. 12B indicates the resonance frequency 303a of the torsion bars 111a and 111b in the torsion mode and the resonance frequency 304 of the first piezoelectric drive units 112a and 112b in the bending mode.

In either case of FIGS. 12A and 12B, driving the mirror to rotate with the resonance frequency of the torsion mode achieves a higher oscillation angle.

Figure 13A:
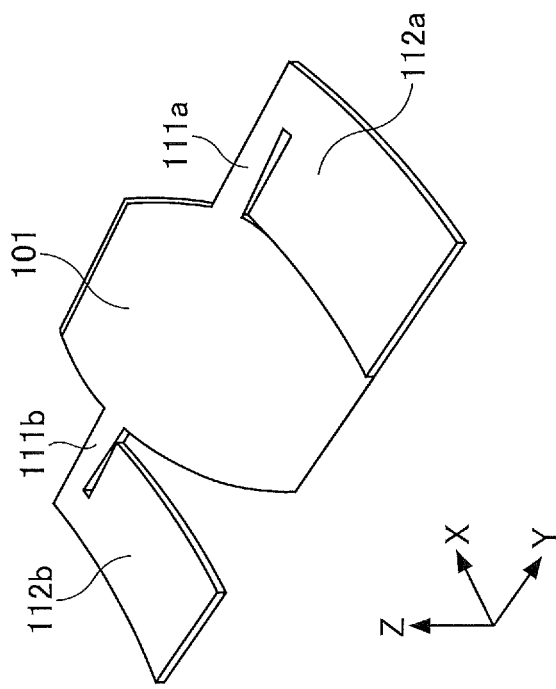
FIG. 13A is an illustration of the shape of the first piezoelectric drive units, the torsion bars, and the mirror in a bending mode of the first piezoelectric drive units.
Figure 13B:
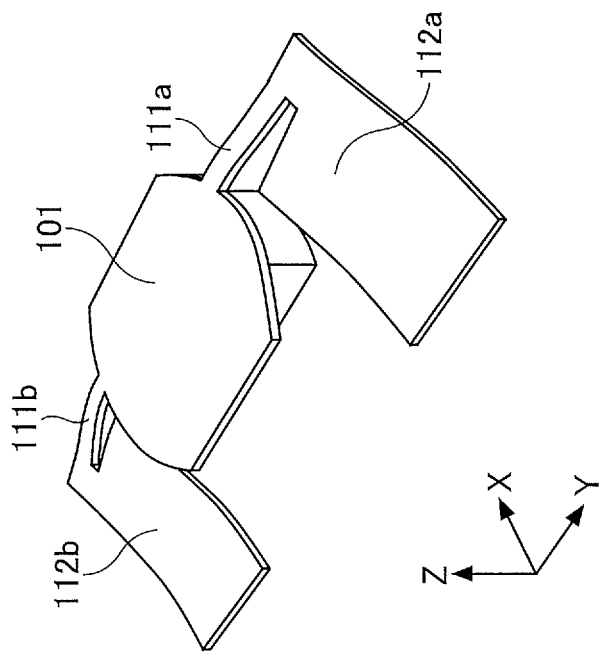
FIG. 13B is an illustration of the shape of the first piezoelectric drive units, the torsion bars, and the mirror in a torsion mode of the torsion bars.

FIGS. 13A and 13B are illustrations of the shapes of the first piezoelectric drive units 112a and 112b, the torsion bars 111a and 111b, and the mirror 101 in the bending mode of the first piezoelectric drive units 112a and 112b and in the torsion mode of the torsion bars 111a and 111b. FIG. 13A is an illustration of the shape of the first piezoelectric drive units 112a and 112b, the torsion bars 111a and 111b, and the mirror 101 in the bending mode of the first piezoelectric drive units 112a and 112b. FIG. 13B is an illustration of the shape of the first piezoelectric drive units 112a and 112b, the torsion bars 111a and 111b, and the mirror 101 in the torsion mode of the torsion bars 111a and 111b.

With an increase in the size of the mirror 101, the masses of the end portions of the first piezoelectric drive units 112a and 112b increase, and thus the resonance frequencies of the first piezoelectric drive units 112a and 112b in the bending mode decrease. In order to maintain desired resonance frequencies, the length of the first piezoelectric driving units 112a and 112b along the first-axis is to be reduced. However, the reduction in the length of the first piezoelectric drive units 112a and 112b along the first-axis reduces the amplitude (the amount of amplitude) of the end portions of the first piezoelectric drive units 112a and 112b. The reduced amount of amplitude of the end portions of the first piezoelectric drive units 112a and 112b may hamper the center of oscillation from coinciding with the center of the mirror 101. Further, when the amount of amplitude of the end portions of the first piezoelectric drive units 112a and 112b is increased with a reduced length of the first piezoelectric drive units 112a and 112b along the first-axis, the deformation of the piezoelectric drive units per unit length increases and thus causes the movable device to more likely break.

To avoid such a situation, in the present embodiment, first drive thick portions 117a and 117b and second drive thick portions 118a and 118b extend in the direction in which the primary bending deformation of the first piezoelectric drive units 112a and 112b increases or decreases on the lower surfaces of the first piezoelectric drive units 112a and 112b. This configuration enables an increase in the bending stiffness of the first piezoelectric drive units 112a and 112b. This thus allows the resonance frequencies of the first piezoelectric drive units 112a and 112b in the bending mode to be set to close to the resonance frequencies of the torsion bars 111a and 111b in the torsion mode while maintaining the sufficient lengths of the first piezoelectric drive units 112a and 112b.

Figure 14:
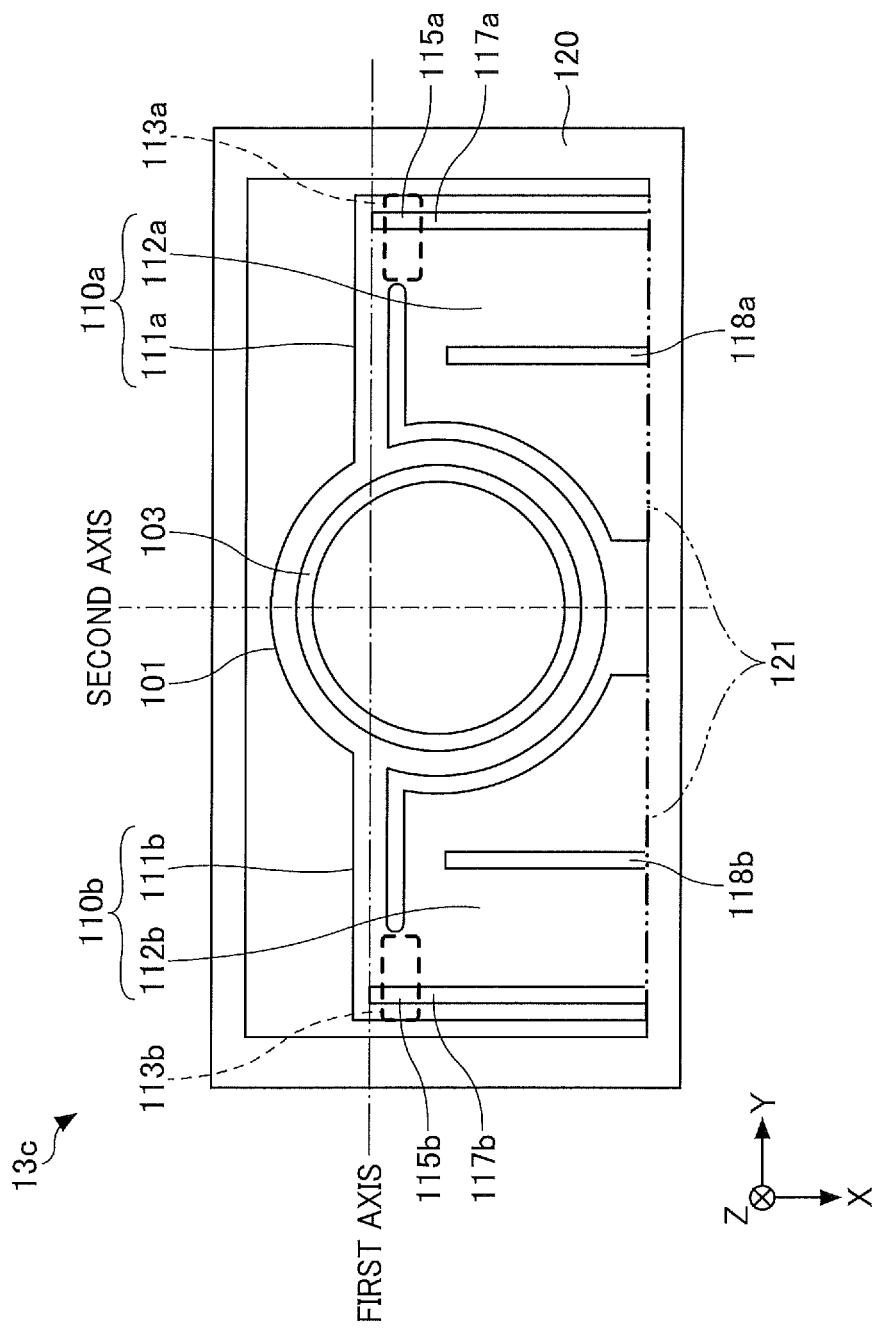
FIG. 14 is a bottom view of a movable device according to a first modification of a second embodiment of the present disclosure.

FIG. 14 is a bottom view of a movable device 13c according to an embodiment of the present disclosure. As illustrated in FIG. 14, the movable device 13c includes first drive thick portions 117a and 117b and second drive thick portions 118a and 118b.

The first drive thick portions 117a and 117b and the second drive thick portions 118a and 118b are composed of the silicon support layer 161 formed on the lower surface of the silicon active layer 163 in the first piezoelectric drive units 112a and 112b. In the first piezoelectric drive units 112a and 112b, the portions provided with the first drive thick portions 117a and 117b and the second drive thick portions 118a and 118b are thicker than portions composed only of the silicon active layer 163.

The first drive thick portions 117a and 117b and the second drive thick portions 118a and 118b extend along the second axis, or the ±X-direction orthogonal to the first axis. The second-axis (in the ±Z-direction) corresponds to a direction in which the primary bending deformation of the first piezoelectric drive units 112a and 112b increases or decreases.

The first drive thick portion 117a is connected to the connecting thick portion 115a on the connecting portion 113a and extends from the connecting portion 113a to the fixed portion 121 along the second-axis, thus to be connected to the fixed portion 121. The first drive thick portion 117b is connected to the connecting thick portion 115b on the connecting portion 113b and extends from the connecting portion 113b to the fixed portion 121 along the second-axis, thus to be connected to the fixed portion 121.

The second drive thick portion 118a is closer to the mirror 101 than the first drive thick portion 117a is, and extends along the second-axis thus to be connected to the fixed portion 121. The second drive thick portion 118b is closer to the mirror 101 than the first drive thick portion 117a is, and extends along the second-axis thus to be connected to the fixed portion 121.

This configuration enables an increase in the bending stiffness of the first piezoelectric drive units 112a and 112b. This thus allows the resonance frequencies of the first piezoelectric drive units 112a and 112b in the bending mode to be set to close to the resonance frequencies of the torsion bars 111a and 111b in the torsion mode while maintaining the sufficient lengths of the first piezoelectric drive units 112a and 112b. This further allows the center of oscillation to substantially coincide with the center of the mirror 101 and thus reduces the surface deformation of the mirror 101.

When the movable device 13c further includes the support thick portions 114a and 114b on the torsion bars 111a and 111b, the first drive thick portion 117a is connected to the support thick portion 114a, and the first drive thick portion 117b is connected to the support thick portion 114b.

Figure 15:
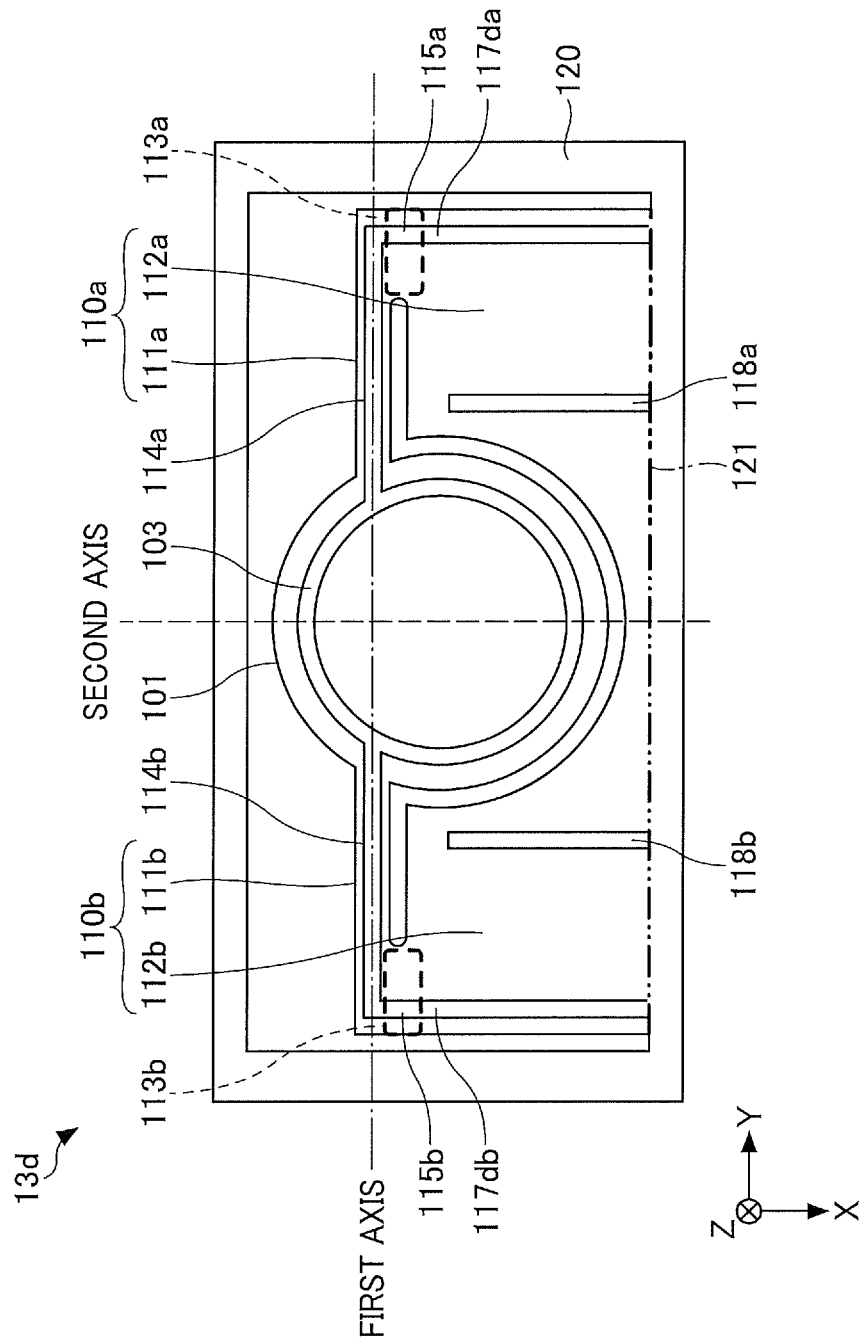
FIG. 15 is a bottom view of a movable device according to a second modification of the second embodiment of the present disclosure.

FIG. 15 is a bottom view of a movable device 13d according to an embodiment of the present disclosure. The movable device 13d includes a first drive thick portion 117da and a first drive thick portion 117db. The first drive thick portion 117da is connected to the support thick portion 114a, and the first drive thick portion 117db is connected to the support thick portion 114b. This configuration eliminates an abrupt change in the thickness of the thick portions and reduces the stress concentration, thus achieving an increase in the angle limit to reach the breaking point.

FIGS. 16A and 16B are graphs of the relation between an offset ΔS, the length of the first piezoelectric drive units 112a and 112b, and the position of the center of oscillation. FIG. 16A is a graph for a comparative example in which the first piezoelectric drive units 112a and 112b are provided with none of the drive thick portions 116a and 116b, the first drive thick portions 117a and 117b, and the second drive thick portions 118a and 118b. FIG. 16B is a graph for an embodiment of the present disclosure in which the first piezoelectric drive units 112a and 112b are provided with the drive thick portions 116a and 116b, the first drive thick portions 117a and 117b, and the second drive thick portions 118a and 118b.

As illustrated in FIG. 16A for the case in which the first piezoelectric drive units 112a and 112b are provided with none of the drive thick portions 116a and 116b, the first drive thick portions 117a and 117b, and the second drive thick portions 118a and 118b, increasing the offset ΔS still fails to achieve a center of oscillation of 0 (i.e., fails to achieve the center of the mirror 101 coincident with the center of oscillation).

In contrast, it can be seen from FIG. 16B according to an embodiment that the center of oscillation may become 0 depending on the combination of the offset ΔS and the first piezoelectric drive units 112a and 112b. In FIG. 16A, the point where the center of oscillation becomes 0 is the optimum solution of design, and the mirror will properly rotate. By doing so, the surface deformation of the mirror 101 can be minimized.

Figure 17:
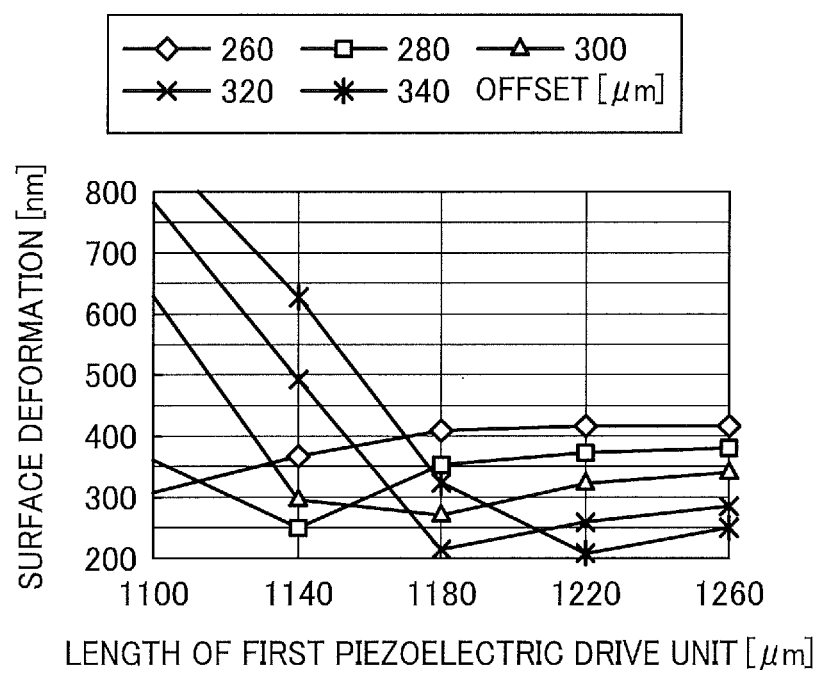
FIG. 17 is a graph of the relation between an offset, the length of the first piezoelectric drive units, and the surface deformation, according to an embodiment of the present disclosure.
Figure 18:
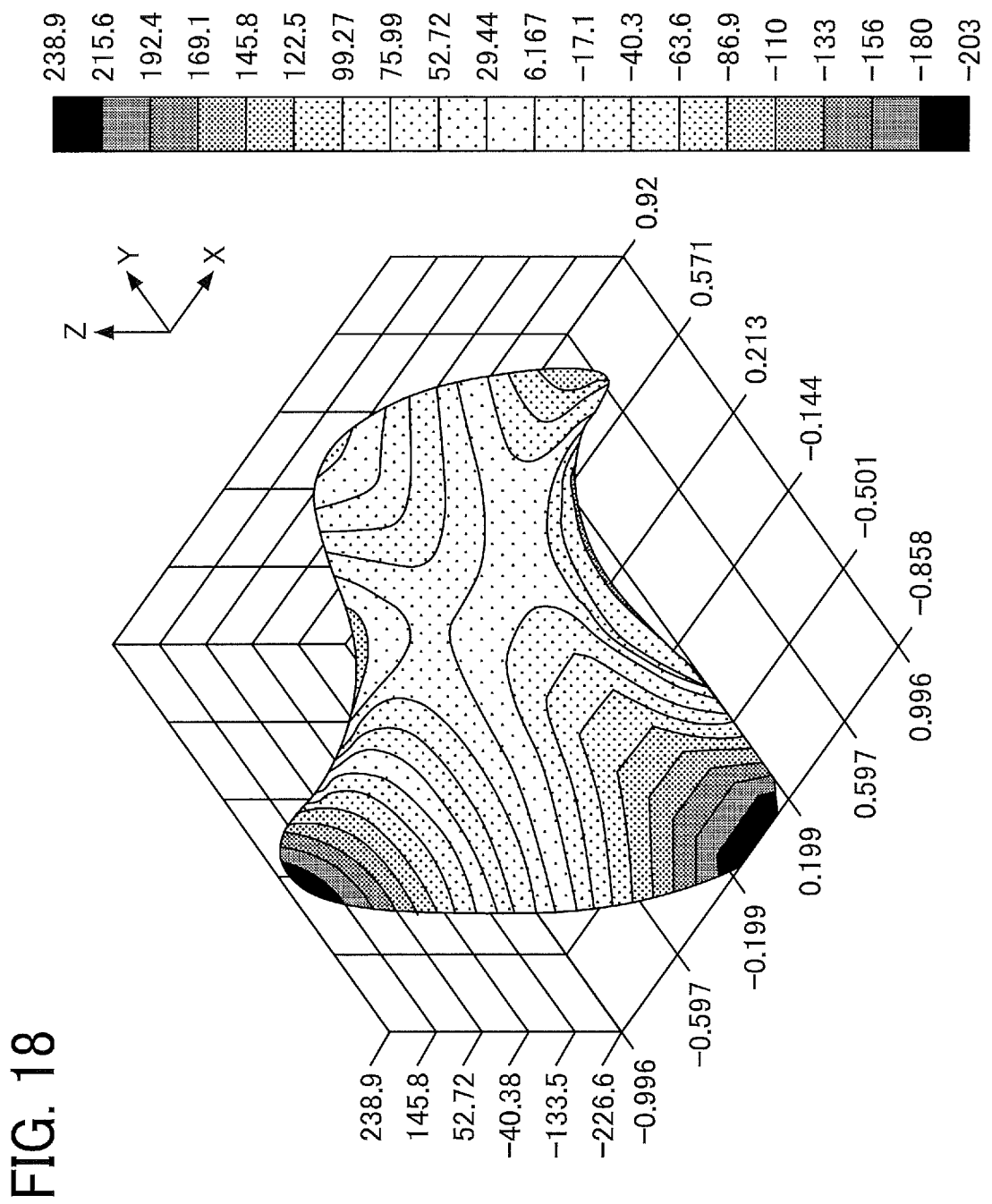
FIG. 18 is a distribution chart of surface deformation of the mirror.

FIG. 17 is a diagram of the relation between an offset ΔS, the length of the first piezoelectric drive units 112a and 112b, and the surface deformation, according to an embodiment of the present disclosure. The vertical axis of FIG. 17 plots peak-to-peak values nm of the surface deformation in FIG. 18. FIG. 18 is a distribution chart of the surface deformation of the mirror 101, according to an embodiment.

The following describes advantageous effects of a movable device 13c.

The length of the piezoelectric drive units have been typically has been adjusted in order to set the resonance frequency of the piezoelectric drive units in the primary bending mode to close to the resonance frequency of the mirror.

In contrast, in the present embodiment, the first drive thick portions 117a and 117b and the second drive thick portions 118a and 118b extend in the direction in which the primary bending deformation of the first piezoelectric drive units 112a and 112b increases or decreases on the lower surfaces of the first piezoelectric drive units 112a and 112b. This arrangement enables adjustment of the resonance frequency of the first piezoelectric drive units 112a and 112b in the primary bending mode as desired while maintaining a fixed length of the first piezoelectric drive units 112a and 112b along the direction orthogonal to the first-axis.

Since the size of the first support frame 120 is reduced as the lengths of the first piezoelectric drive units 112a and 112b decrease, the lengths of the first piezoelectric drive units 112a and 112b are preferably shorter in order to increase the resonance frequencies of the oscillation around the second-axis. However, even if the length of the first piezoelectric drive units 112a and 112b is reduced to be shorter than the diameter of the mirror 101, the downsizing of the first support frame 120 is not achieved.

Further, with a reduction in the length of the first piezoelectric drive units 112a and 112b, the area for the piezoelectric unit 302 to be disposed is reduced, and the drive force is reduced. Thus, the oscillation angle of the mirror is reduced. Further, in order to make the center of oscillation of the mirror 101 coincident with the center of the mirror 101 (i.e., make the amplitude ΔZ of the center of the mirror 101 in the Z-direction become zero), the amplitude of the end portions of the first piezoelectric drive units 112a and 112b is to be set according to the offset ΔS.

Further, with a reduction in the length of the first piezoelectric drive units 112a and 112b, the sharper the bending becomes, the stresses applied to the first piezoelectric drive units 112a and 112b increase and the first piezoelectric drive units 112a and 112b are easily broken. To avoid such a breakage of the first piezoelectric drive units 112a and 112b, the first piezoelectric drive units 112a and 112b are to have a certain degree of length.

Furthermore, since the load applied to the first piezoelectric drive units 112a and 112b increases as the mirror 101 becomes larger, the width of the first piezoelectric drive units 112a and 112b is to be increased to increase the width of a portion of the first piezoelectric drive units 112a and 112b fixed to the first support frame 120 when the base of the first piezoelectric drive units 112a and 112b reaches the breaking point.

From the above viewpoint, the lengths of the first piezoelectric drive units 112a and 112b is preferably set to a length that allows the first piezoelectric drive units 112a and 112b on both sides of the mirror to be connected to each other at the −Y-end of the mirror 101.

Setting the number of drive thick portions and the width of the drive thick portion by adjusting the length of the first piezoelectric drive units 112a and 112b in the above-described manner enables adjustment of the resonance frequency of the first piezoelectric drive units 112a and 112b in the primary bending mode. Further, adjusting the center of oscillation and the surface deformation of the mirror 101 allows an optimal design of the movable device 13c.

Figure 19:
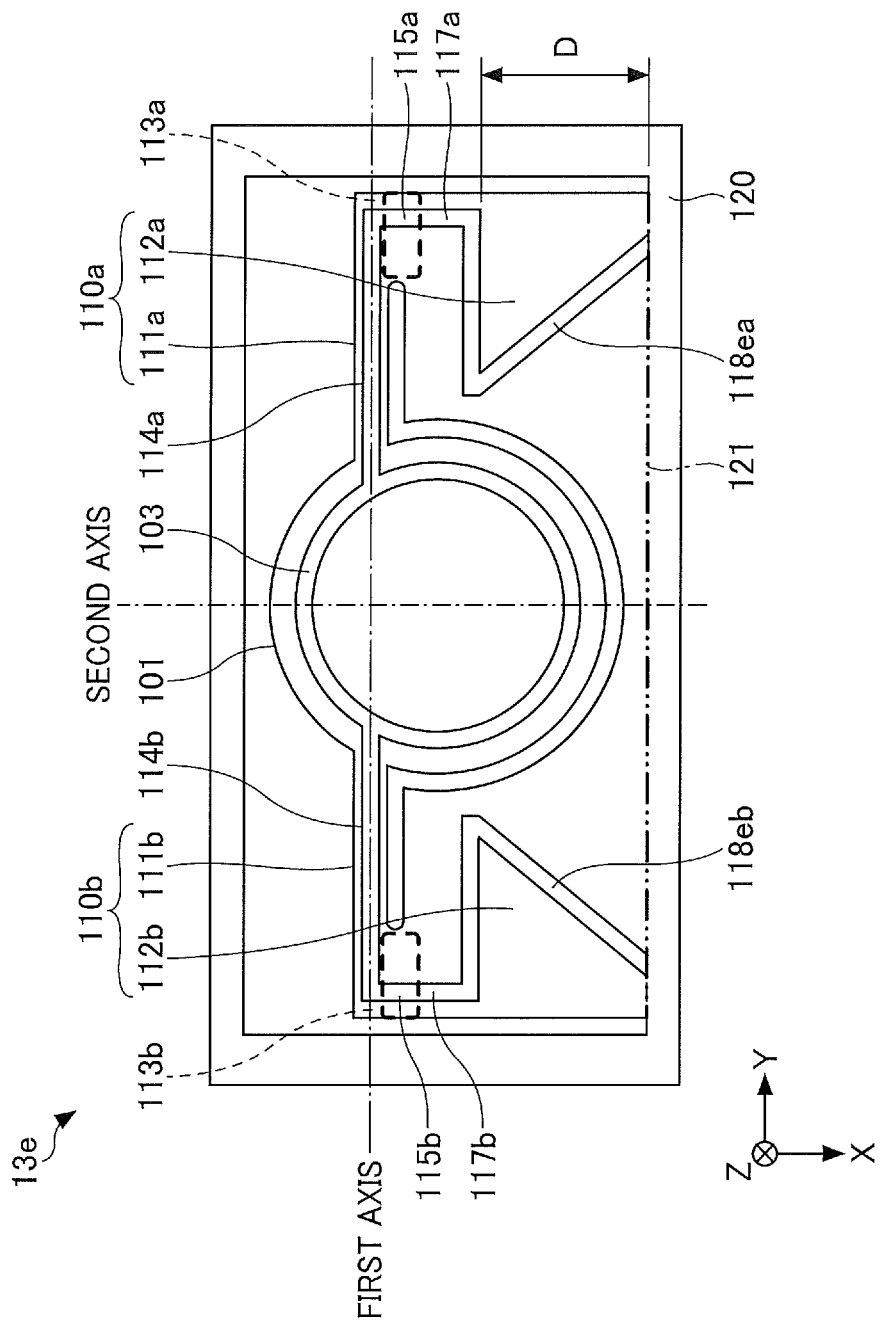
FIG. 19 is a bottom view of a movable device according to a third modification of the second embodiment of the present disclosure.
Figure 20:
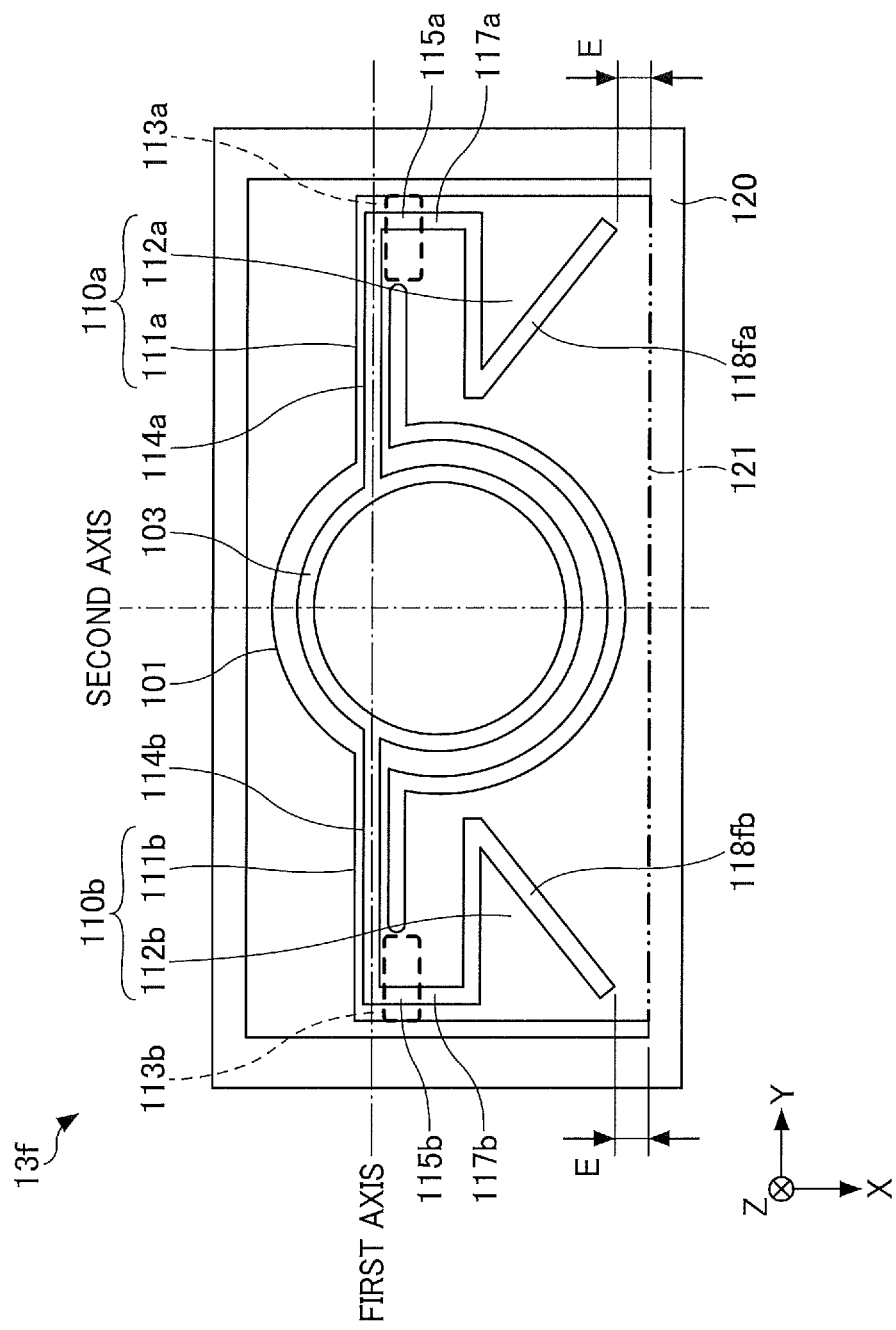
FIG. 20 is a bottom view of a movable device according to a fourth modification of the second embodiment of the present disclosure.

FIG. 19 is an illustration of a movable device 13e according to a modification of the second embodiment. FIG. 20 is an illustration of a movable device 13f according to another modification of the second embodiment. More specifically, FIG. 19 is a bottom view of the movable device 13e, and FIG. 20 is a bottom view of the movable device 13f.

As illustrated in FIG. 19, the movable device 13e includes second drive thick portions 118ea and 118eb extending in the direction intersecting the first-axis. The second drive thick portion 118ea is connected to the first drive thick portion 117a, and the second drive thick portion 118eb is connected to the first drive thick portion 117b. The rigidity of the first piezoelectric drive units 112a and 112b is adjusted by changing the distances D illustrated in FIG. 19, the widths and angles of the first drive thick portions 117a and 117b or the second drive thick portions 118ea and 118eb.

In the case where the resonance frequency becomes too high, the resonance frequency may be lowered by providing a gap E between the support frame 120 and the second drive thick portions 118ea and 118eb as illustrated in FIG. 20.

Other Preferred Embodiments

The movable device 13 according to at least one embodiment may be incorporated in various kinds of systems and devices. The following describes application examples of the movable device 13 in various kinds of systems and devices.

Figure 21:
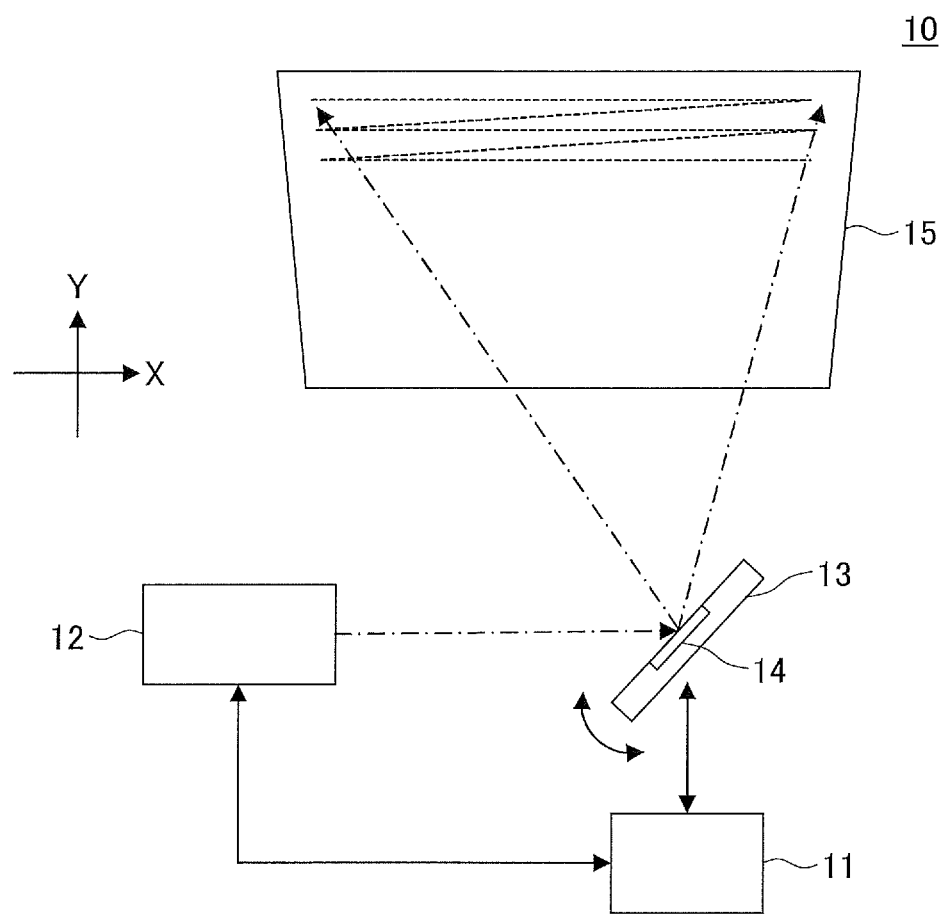
FIG. 21 is a schematic view of an optical scanning system according to an embodiment of the present disclosure.

With initially reference to FIGS. 21 to 24, an optical scanning system incorporating a movable device according to an embodiment is described below in detail. FIG. 21 is a schematic view of an example of an optical scanning system 10. As illustrated in FIG. 21, the optical scanning system 10 deflects light emitted from a light-source device 12 under control of a control device 11, by using a reflecting surface 14 included in the movable device 13, so as to optically scan a target surface 15 to be scanned (hereinafter, referred to as target surface).

The optical scanning system 10 includes the control device 11, the light-source device 12, and the movable device 13 including the reflecting surface 14.

For example, the control device 11 is an electronic circuit unit provided with a central processing unit (CPU) and a field-programmable gate array (FPGA). The movable device 13 is, for example, a MEMS device provided with a movable reflecting surface 14.

The light-source device 12 is, for example, a laser device that emits a laser beam. The surface 15 to be scanned is, for example, a screen.

The control device 11 generates control instructions of the light-source device 12 and the movable device 13 using acquired optical-scanning information, and outputs drive signals to the light-source device 12 and the movable device 13 in accordance with the control instructions. The light-source device 12 emits light in accordance with the received drive signal. The movable device 13 moves the reflecting surface 14 in at least one of a uniaxial direction and a biaxial direction, in accordance with the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device of the present embodiment and the details of the control by the control device are described later.

Figure 22:
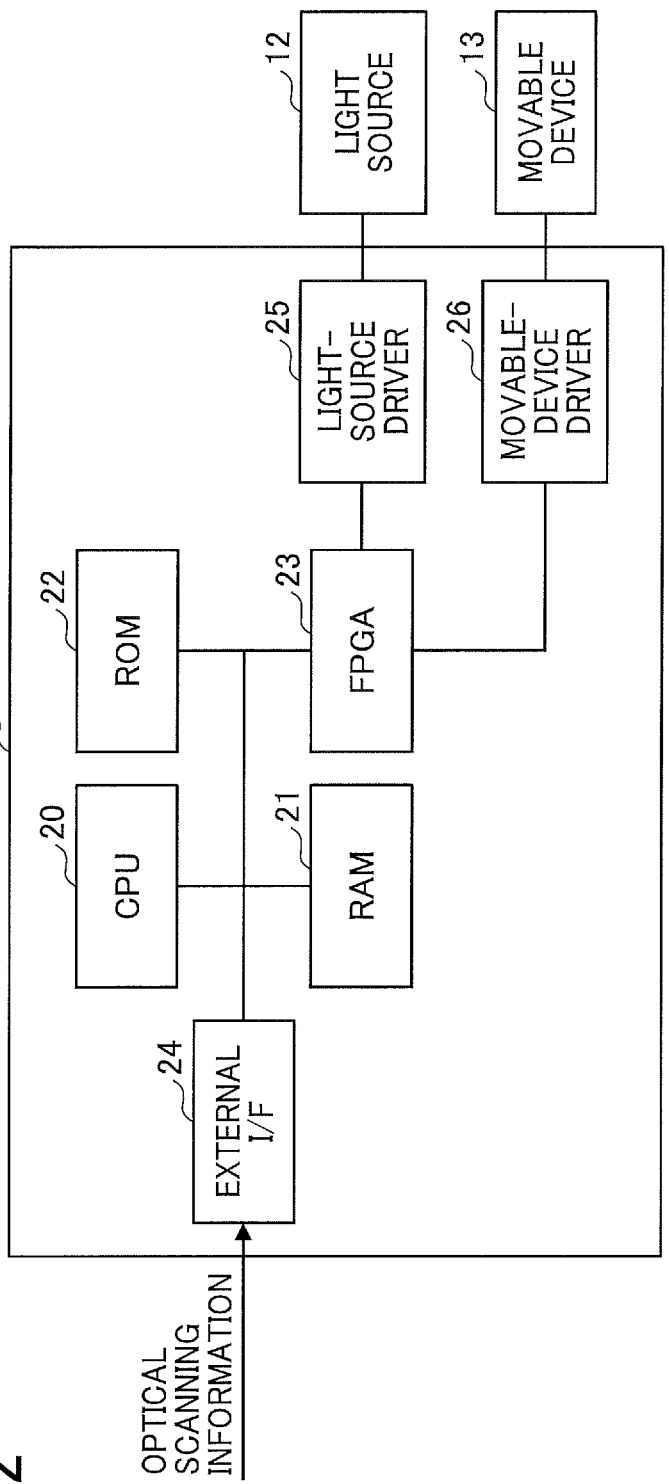
FIG. 22 is a hardware block diagram of the optical scanning system in FIG. 21.

Next, the hardware configuration of an example of the optical scanning system 10 is described referring to FIG. 22. FIG. 22 is a hardware block diagram of an example of the optical scanning system. As illustrated in FIG. 22, the optical scanning system 10 includes the control device 11, the light-source device 12, and the movable device 13, which are electrically connected to one another. The control device 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 is an arithmetic device that loads into the RAM 21 a program or data from a storage device such as the ROM 22 and executes processing to control the entirety of the control device 11.

The RAM 21 is a volatile storage device that temporarily stores a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs proper control signals to the light-source driver 25 and the movable-device driver 26 in accordance with the processing performed by the CPU 20.

For example, the external I/F 24 is an interface with respect to an external device or a network. The external device includes, for example, a host device such as a PC (Personal Computer), and a storage device such as a USB memory, an SD card, a CD, a DVD, an HDD, and an SSD. For example, the network may be a controller area network (CAN) of a vehicle, a local area network (LAN), and the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or the network through the external I/F 24. The CPU 20 may have any configuration that acquires optical scanning information. In some examples, the optical scanning information may be stored in the ROM 22 or in the FPGA 23 of the control device 11. In some other examples, a storage device such as a solid state disk (SSD) may be additionally provided in the control device 11 and the optical scanning information may be stored in the storage device.

In this case, the optical-scanning information indicates how the surface 15 is to be optically scanned. In another example, the optical-scanning information is image data used for optical scanning to display an image. For another example, the optical-scanning information is writing data indicating the order and portion of writing when optical writing is performed by optical scanning. Furthermore, for example, the optical scanning information is irradiation data indicating the timing and range of irradiation of light for object recognition by optical scanning.

The control device 11 has the hardware configuration in FIG. 22, and the components of the hardware configuration operate in accordance with instructions from the CPU 20 to implement the capabilities of the functional configuration as described below.

Figure 23:
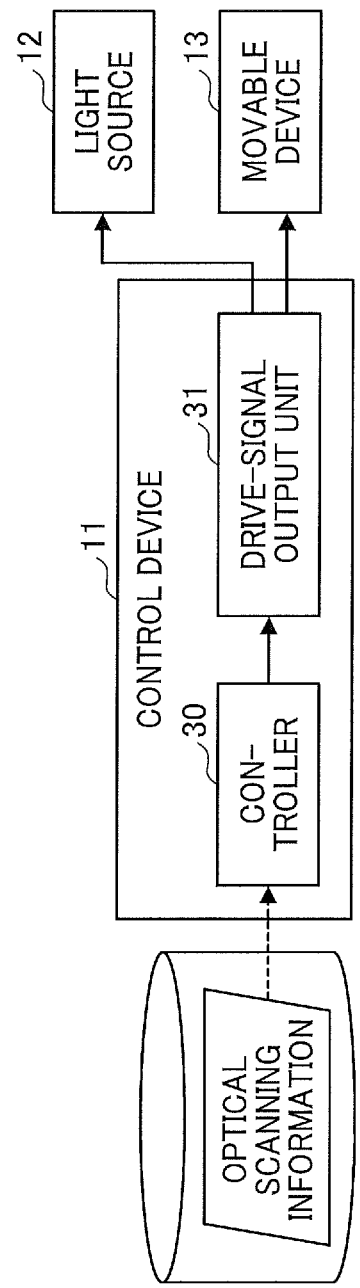
FIG. 23 is a functional block diagram of a control device according to an embodiment of the present disclosure.

Next, the functional configuration of the control device 11 of the optical scanning system 10 is described below referring to FIG. 23. FIG. 23 is a functional block diagram of the control device 11 of the optical scanning system 10, according to an embodiment of the present disclosure.

As illustrated in FIG. 23, the control device 11 has the functions of a controller 30 and a driving-signal output unit 31.

The controller 30 is implemented by, for example, the CPU 20 and the FPGA 23. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 in accordance with the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided in the movable device 13 is moved.

Figure 24:
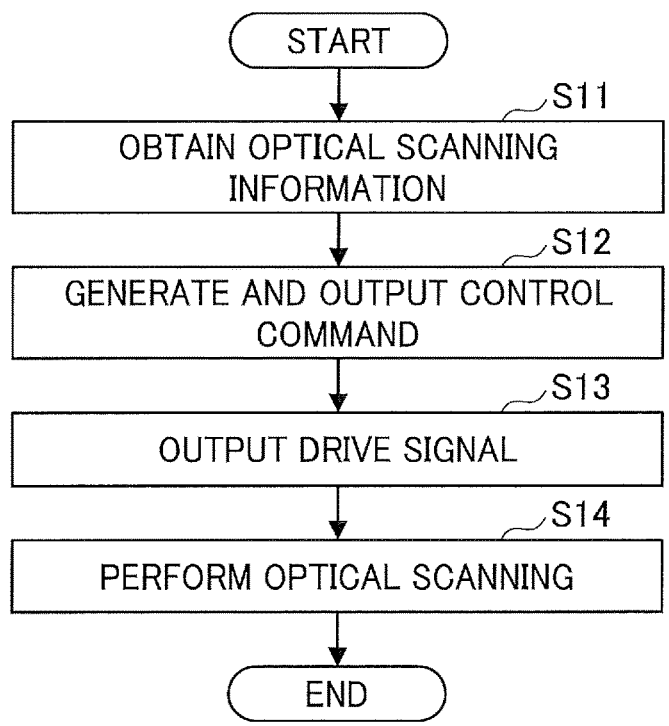
FIG. 24 is a flowchart of processing involved in the optical scanning system, according to an embodiment of the present disclosure.

Next, the process of optically scanning the target surface 15 performed by the optical scanning system 10 is described referring to FIG. 24. FIG. 24 is a flowchart of an example of processing performed by the optical scanning system 10.

In step S11, the controller 30 acquires optical-scanning information from, for example, an external device. In step S12, the controller 30 generates control signals from the acquired optical-scanning information, and outputs the control signals to the drive-signal output unit 31. In step S13, the drive-signal output unit 31 outputs drive signals to the light-source device 12 and the movable device 13 based on the received control signals. In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may be configured by the control device 11 and the movable device 13 provided with the reflecting surface 14, which are elements of the above optical scanning system 10.

As described above, the optical scanning system incorporating the movable device 13 according to at least one embodiment achieves a reduction in resonance frequency due to upsizing of the movable portion and enables optical scanning with a higher accuracy.

An image projection apparatus incorporating a movable device according to at least one embodiment is described in detail with reference to FIGS. 25 and 26.

Figure 25:
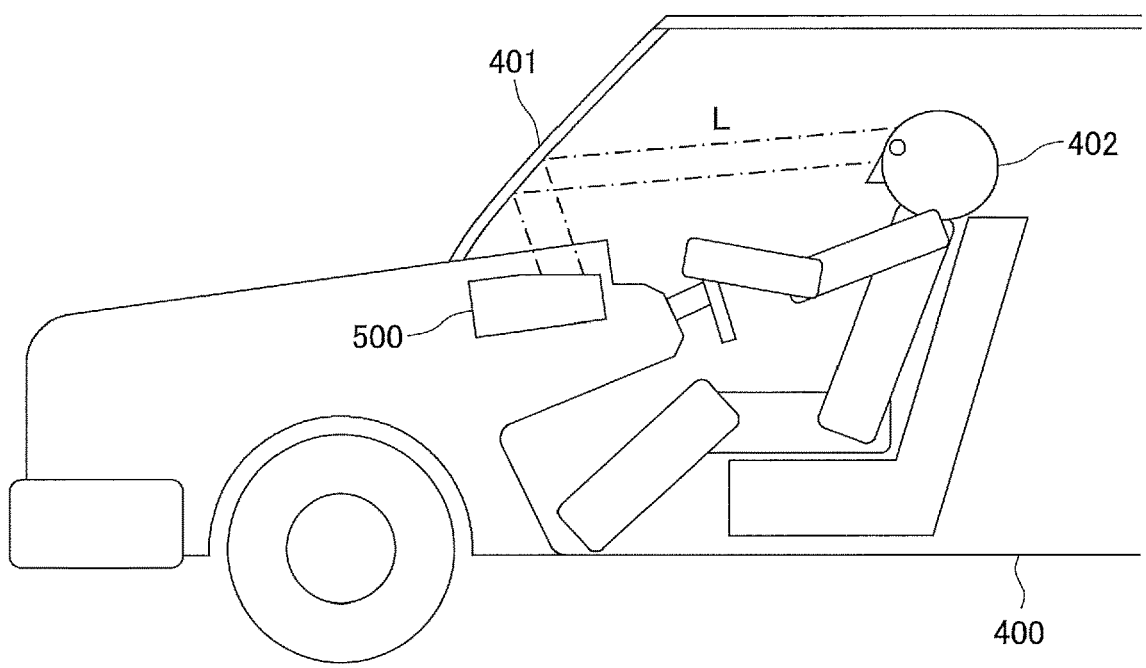
FIG. 25 is a schematic view of an example of a vehicle equipped with a head-up display device (HUD)

FIG. 25 is a schematic view of a vehicle 400 equipped with a HUD 500 as an example of an image projection device according to an embodiment. FIG. 26 is a schematic view of the HUD 500 according to an embodiment of the present disclosure. The vehicle 400 is an example of a mobile object.

The image projection apparatus is an apparatus that projects an image by optical scanning, and is, for example, a HUD.

As illustrated in FIG. 25, for example, the HUD 500 is disposed, for example, near a windshield 401 of the vehicle 400. Projection light L that is emitted from the HUD 500 is reflected by the windshield 401 and directed to a viewer (a driver 402) as a user. Accordingly, the driver 402 can visually recognize an image or the like projected by the HUD 500, as a virtual image. Alternatively, a combiner may be disposed on the inner wall surface of the windshield 401 so that the user can visually recognize a virtual image formed by the projection light that is reflected by the combiner.

Figure 26:
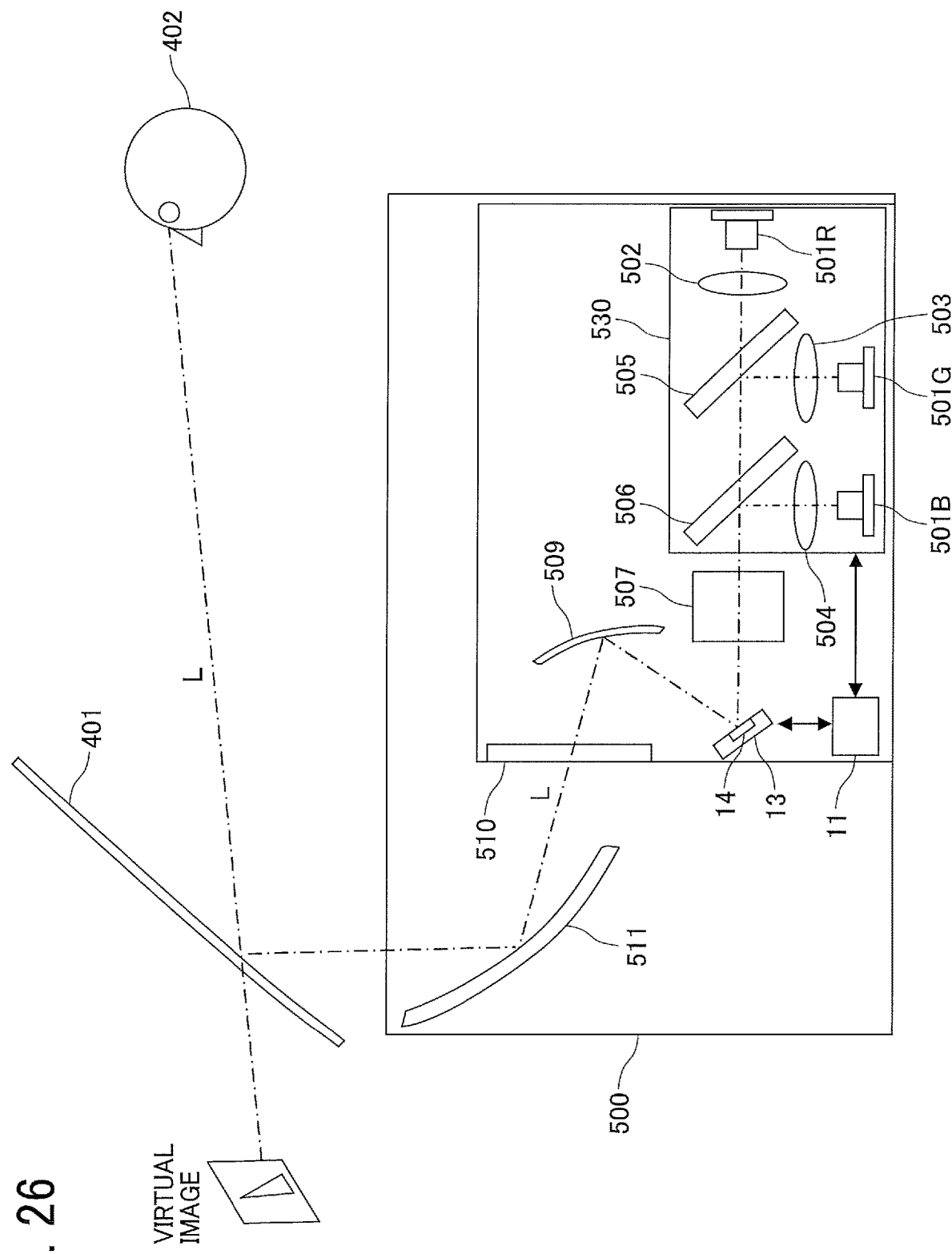
FIG. 26 is a schematic view of a HUD according to an embodiment of the present disclosure.

As illustrated in FIG. 26, the HUD 500 emits laser beams having different wavelengths from red, green, and blue laser-beam sources 501R, 501G, and 501B (multiple light sources of a light source unit of the HUD 500), respectively. The emitted laser beams pass through an incident optical system, and then are deflected by the movable device 13 including the reflecting surface 14. The incidence optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system (an optical system, of the image projection apparatus) includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source unit of the HUD 500).

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. Each of the dichroic mirrors 505 and 506 is an example of a combiner. The light intensity of the combined laser beams is adjusted by the light-intensity adjuster 507, and then two-dimensional scanning is performed by the movable device 13 provided with the reflecting surface 14. The light L being deflected for two-dimensional scanning by the movable device 13 is reflected by the free-form surface mirror 509 and has its distortion corrected, thus being condensed on the intermediate screen 510. The intermediate screen 510 includes a microlens array in which multiple microlenses are two-dimensionally arranged, and enlarges the projection light L incident on the intermediate screen 510 in units of microlens.

The movable device 13 moves the reflecting surface 14 biaxially in a reciprocating manner to perform two-dimensional scanning with the projection light L incident on the reflecting surface 14. The movable device 13 is controlled in synchronization with the light-emitting timing of the laser-beam sources 501R, 501G, and 501B.

In the above description, the heads-up display 500 is described as an example of the image projection apparatus. However, no limitation is indicated thereby, and the image projection apparatus may be any apparatus that performs optical scanning, using the movable device 13 provided with the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection device may be incorporated in, not only the vehicle or the wearable member, but also, for example, a mobile object such as an aircraft, a ship, or a mobile robot; or an immobile object such as an operation robot that operates a driving target such as a manipulator without moving from the installed location.

As described above, the image projection device incorporating the movable device 13 according to at least one embodiment achieves a reduction in resonance frequency due to upsizing of the movable portion and enables optical scanning with a higher accuracy.

Next, an optical writing device incorporating the movable device 13 according to an embodiment of the present disclosure is described in detail with reference to FIGS. 27 and 28.

Figure 27:
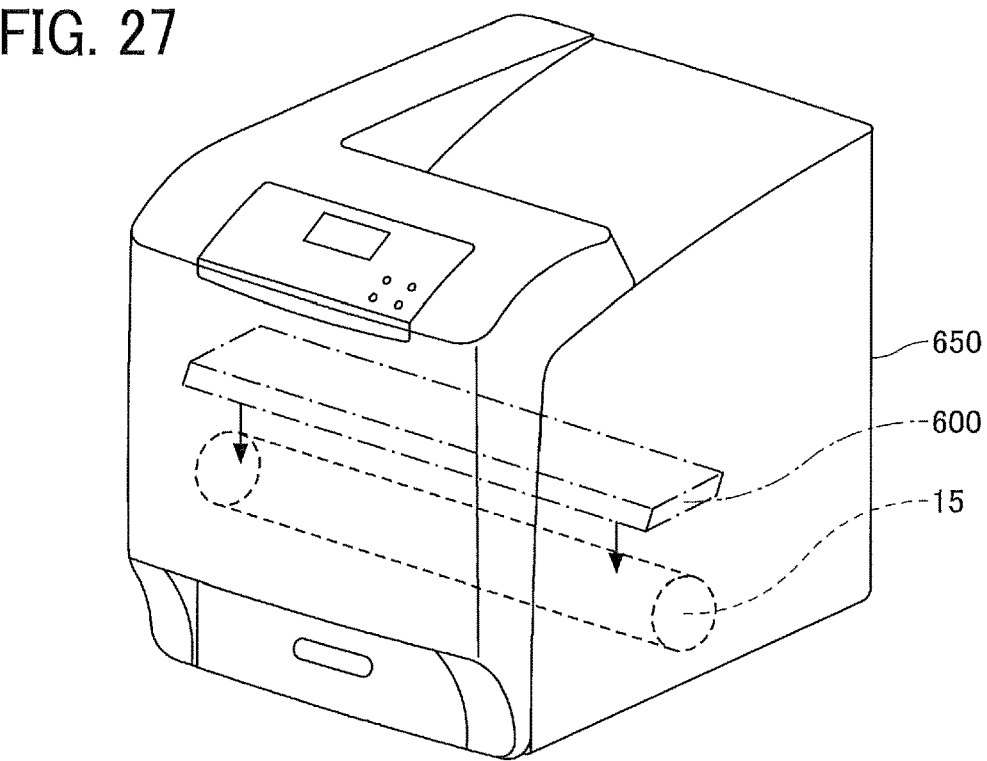
FIG. 27 is a schematic view of an example of an image forming apparatus equipped with an optical writing device.

FIG. 27 is an illustration of an example of an image forming apparatus equipped with the optical writing device 600. FIG. 28 is a schematic view of an example of the optical writing device 600.

As illustrated in FIG. 27, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 28:
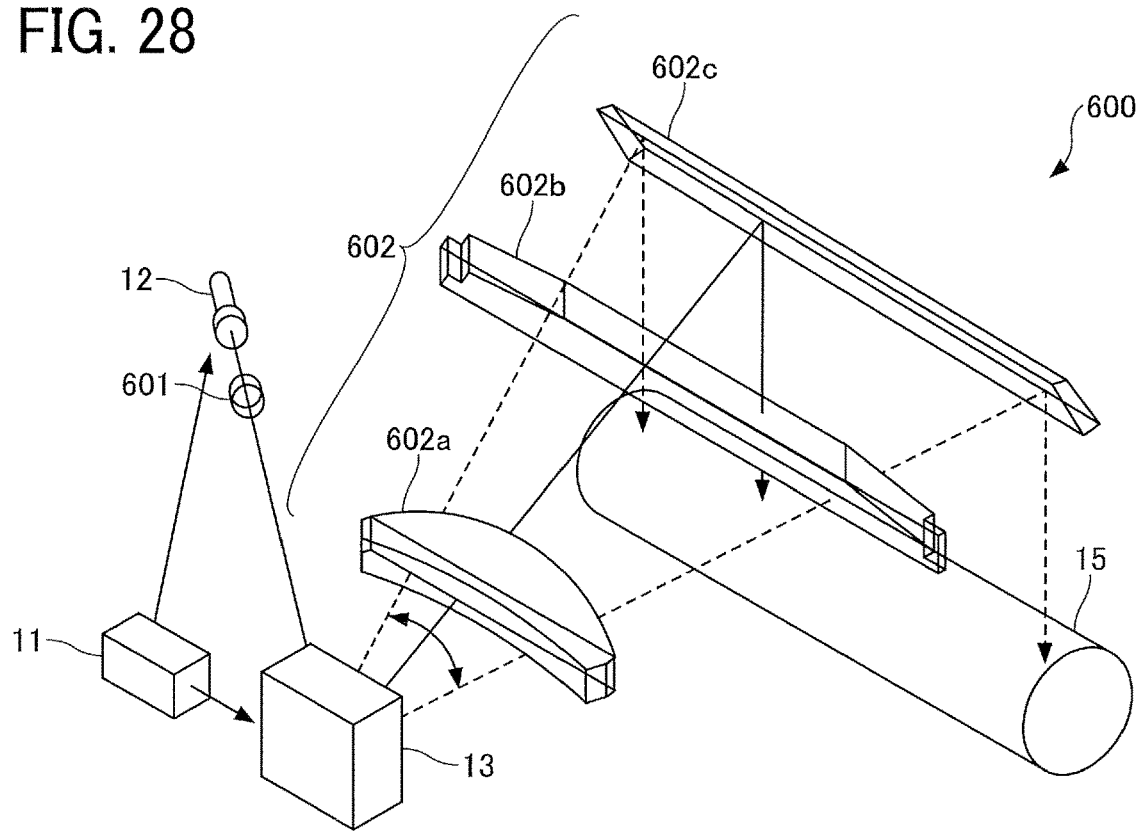
FIG. 28 is a schematic view of an example of the optical writing device.

As illustrated in FIG. 28, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The light-source device 12 and the movable device 13 including the reflecting surface 14 are controlled by the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device saves power of the optical writing device because power consumption for driving the movable device 13 is less than that for driving a rotational polygon mirror. The movable device 13 makes a smaller wind noise when the mirror substrate oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

As described above, the optical writing device incorporating the movable device 13 according to at least one embodiment achieves a reduction in resonance frequency due to upsizing of the movable portion and enables optical scanning with a higher accuracy.

Figure 29:
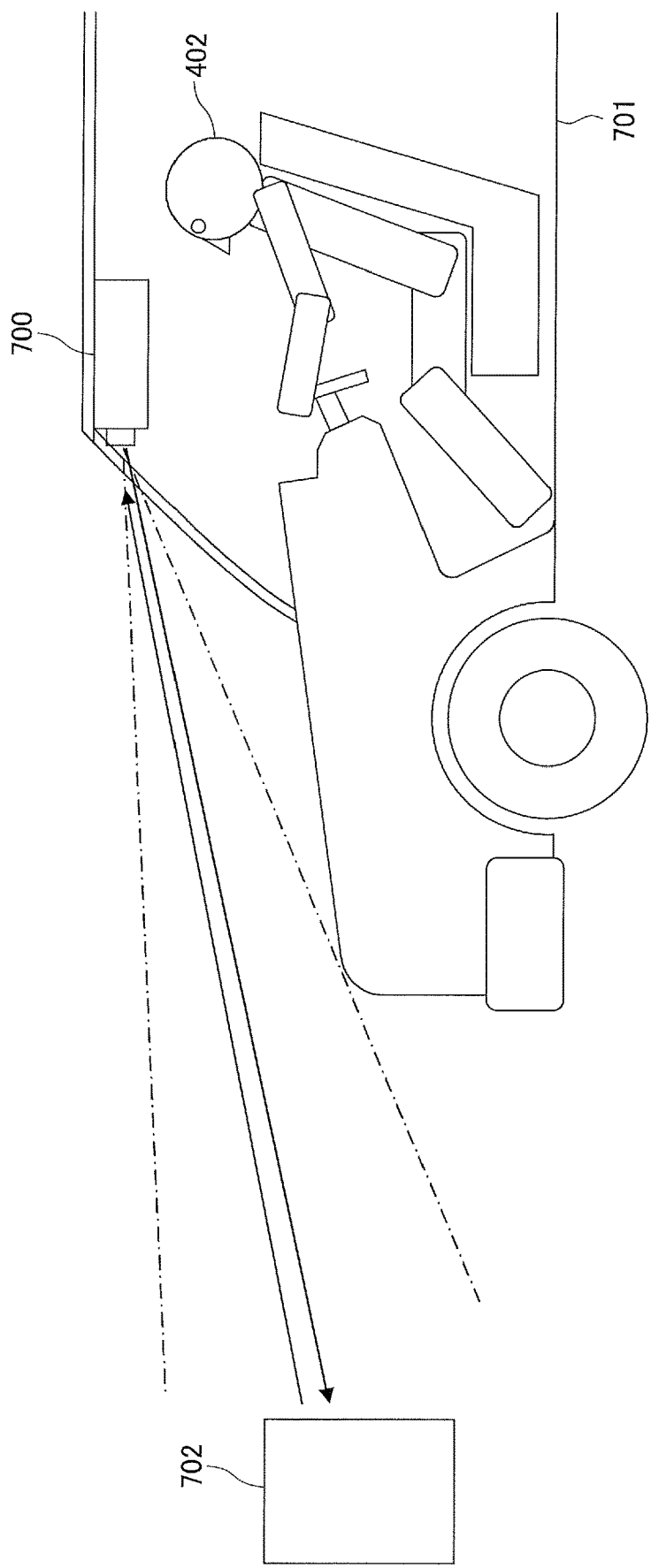
FIG. 29 is a schematic view of a motor vehicle mounted with a light detection and ranging (LiDAR) device.
Figure 30:
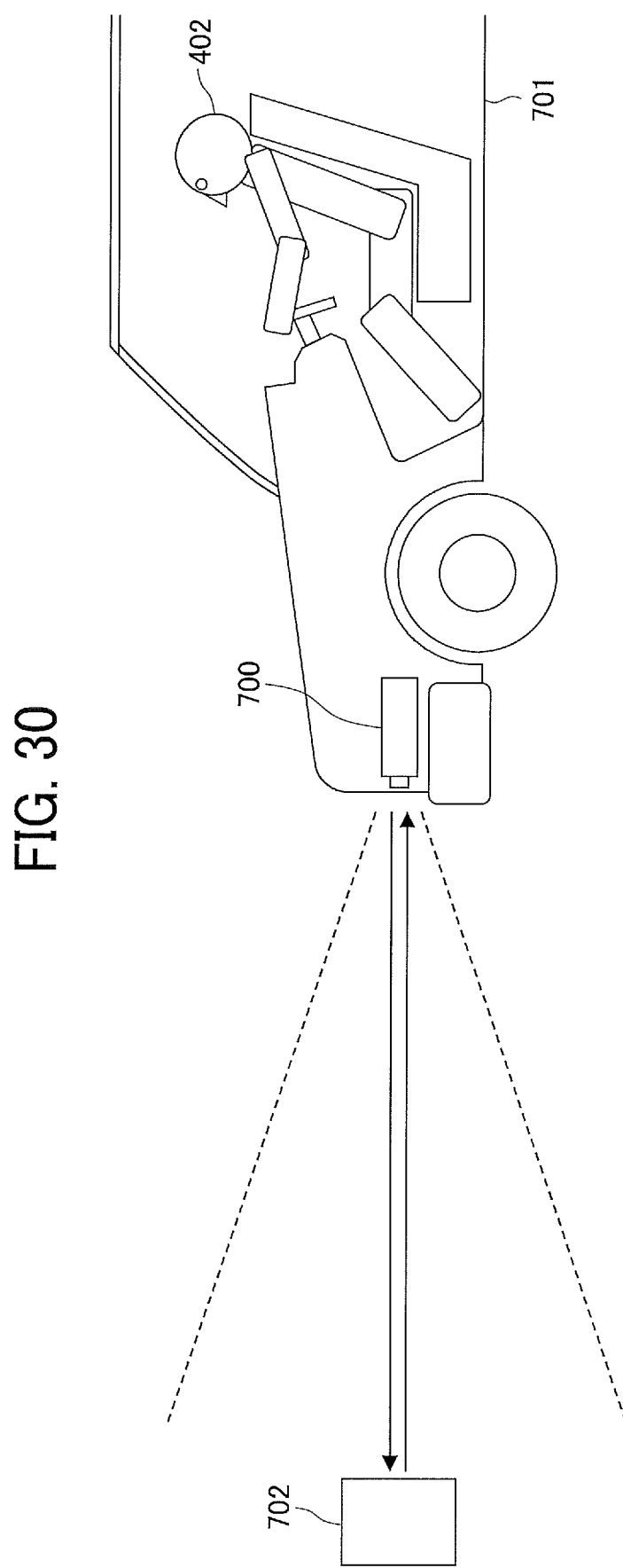
FIG. 30 is a schematic view of another example of an automobile on which LiDAR device is mounted.
Figure 31:
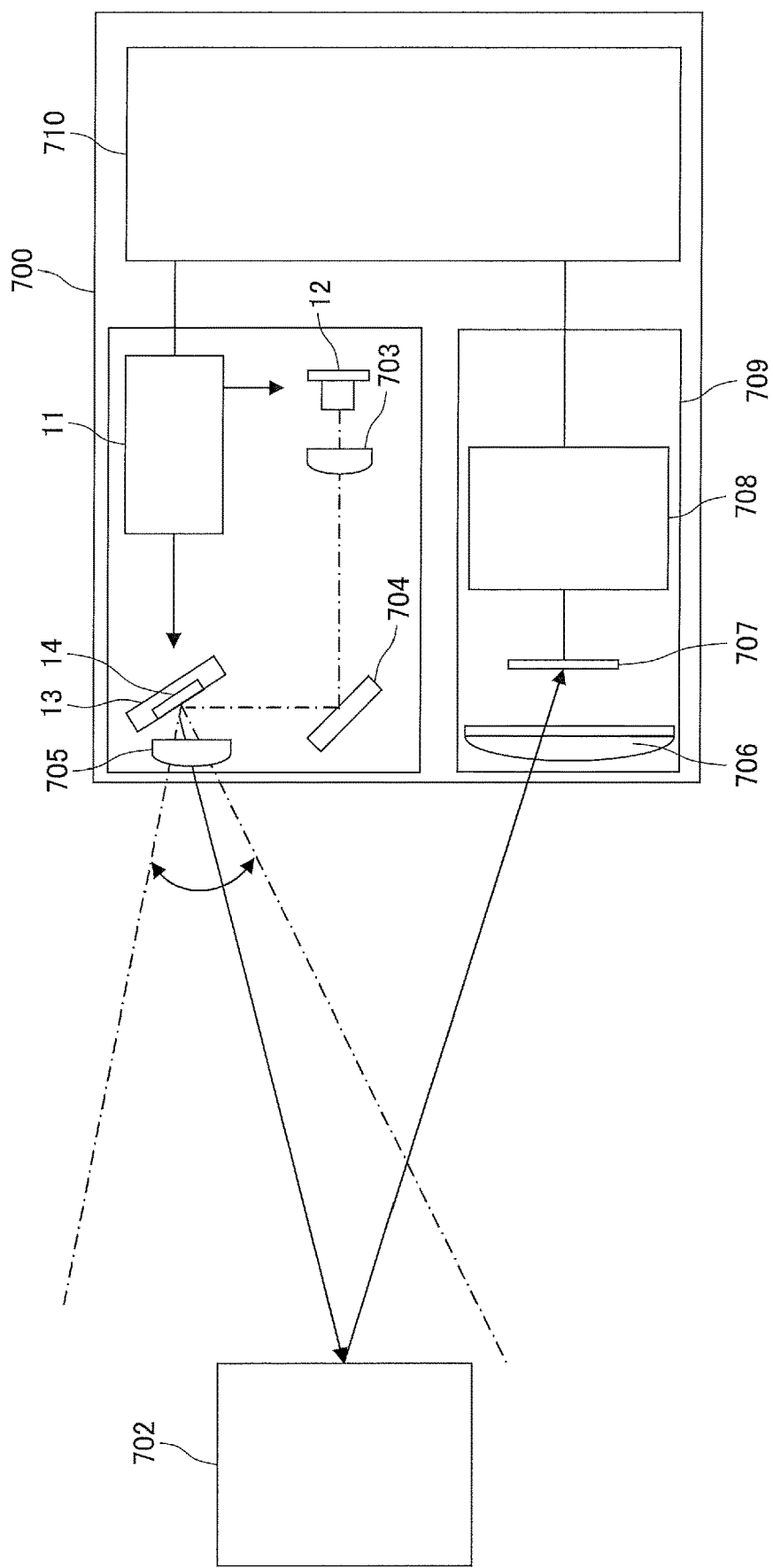
FIG. 31 is a schematic view of the LiDAR device according to an embodiment of the present disclosure.

Next, a distance measurement apparatus incorporating the movable device according to an embodiment is described in detail referring to FIGS. 29 to 31.

FIGS. 29 and 30 is a schematic view of a vehicle mounted with a LiDAR device, which is an example of a distance measurement apparatus, in a lamp unit on which a headlamp of the vehicle is mounted. FIG. 31 is a schematic view of an example of the LiDAR device.

The distance measurement apparatus, which is, for example, a LiDAR device, measures a distance in a direction to the target object, or a target direction.

As illustrated in FIGS. 29 and 30, for example, a LiDAR device 700 is mounted on a vehicle 701 to perform optical scanning in a target direction and receive the light reflected from an object 702 that exists in the target direction. Accordingly, the LiDAR device 700 measures a distance to the object 702. The vehicle 701 is an example of a mobile object.

As illustrated in FIG. 31, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing device 708. The signal processing device 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or absent to measure the distance from the obstacle.

In the present embodiment, the LiDAR device 700 is described as an example of the distance measurement apparatus. However, no limitation is intended thereby. The distance measurement apparatus may be any apparatus that performs optical scanning by controlling the movable device 13 provided with the reflecting surface 14, using the control device 11, and that receives the receives the reflected laser beam using a photodetector to measure the distance to the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

As described above, the distance measurement apparatus incorporating the movable device 13 according to at least one embodiment achieves a reduction in resonance frequency due to upsizing of the movable portion and enables optical scanning with a higher accuracy.

Figure 32:
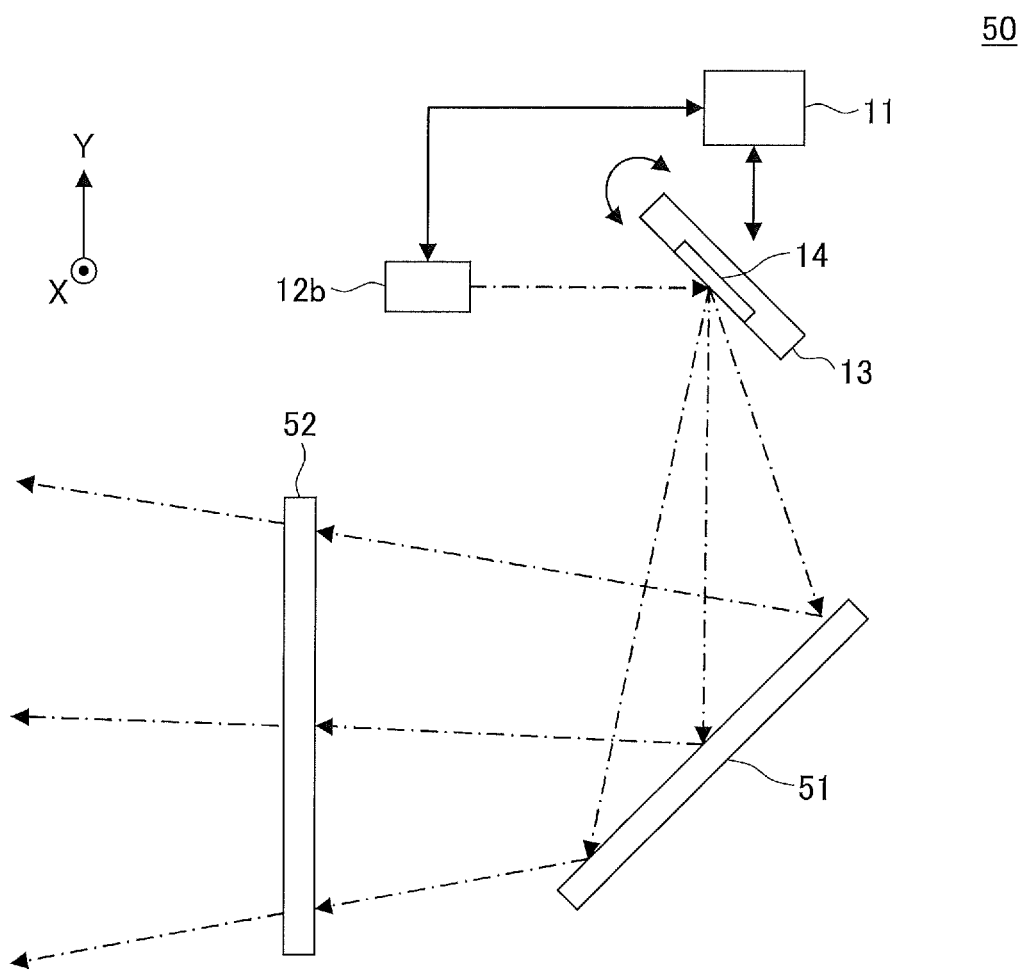
FIG. 32 is a schematic view of an example of a configuration of a laser headlamp.

Next, a laser headlamp 50 in which the movable device according to the present embodiment is applied to a headlight of a car is described with reference to FIG. 32. FIG. 32 is an illustration of the configuration of a laser headlamp 50 according to an embodiment of the present disclosure.

The laser headlamp 50 includes a control device 11, a light-source device 12b, a movable device 13 including a reflecting surface 14, a mirror 51, and a transparent plate 52.

The light-source device 12b is a light source that emits blue laser beams. The laser beams emitted from the light-source device 12b are incident on the movable device 13 and are reflected by the reflecting surface 14. The movable device 13 moves the reflecting surface 14 in the XY-direction in accordance with signals from the control device 11, and performs two-dimensional scanning using the blue laser beam emitted from the light-source device 12b in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Thereby, the front of the automobile is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the vehicle.

When the movable device 13 is applied to a headlight of a vehicle, the color of light beams from the light-source device 12b and the color of the phosphor are not limited to blue and yellow, respectively. For example, the light-source device 12b may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

As described above, the laser headlamp incorporating the movable device 13 according to at least one embodiment achieves a reduction in resonance frequency due to upsizing of the movable portion and enables optical scanning with a higher accuracy.

Figure 33:
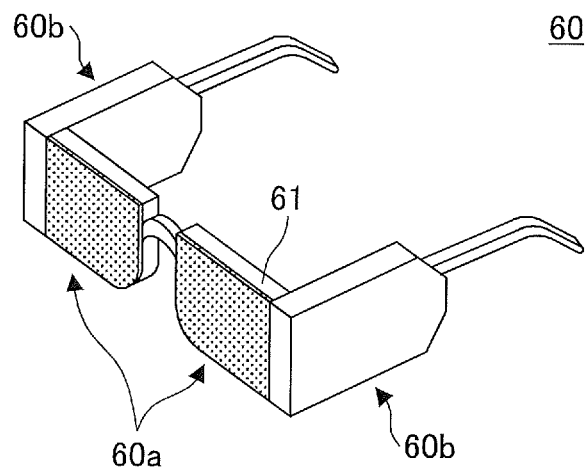
FIG. 33 is a perspective view of the external appearance of a head-mounted display (HMD) according to an embodiment of the present disclosure.
Figure 34:
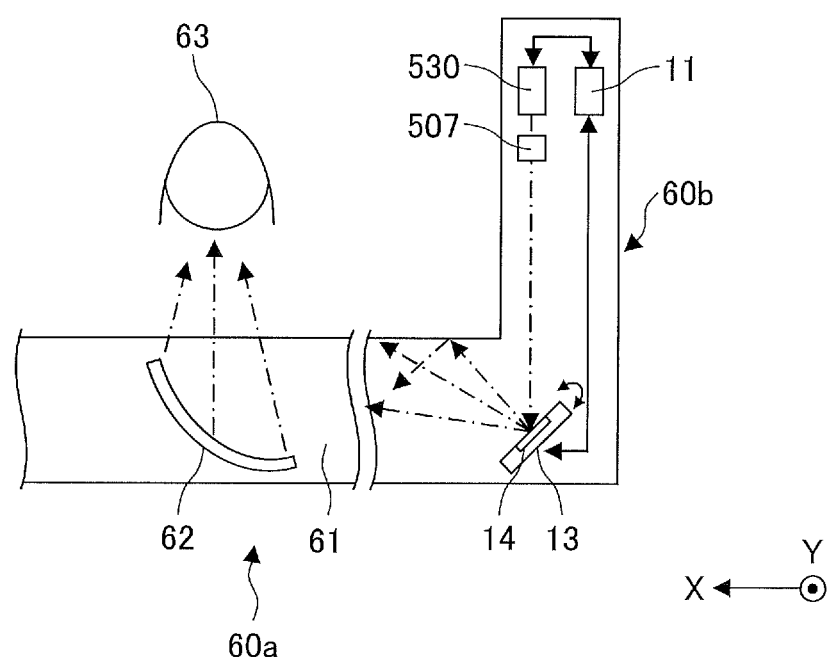
FIG. 34 is an illustration of a part of the configuration of the HMD in FIG. 33.

Next, a head-mounted display (HMD) 60 to which the movable device 13 according to an embodiment is applied is described referring to FIGS. 33 and 34. Note that the HMD 60 is a head-mounted display that can be mounted on a human head, and can be shaped like, for example, glasses. In the following description, such a head-mounted display may be referred to simply as an HMD.

FIG. 33 is a perspective view of the appearance of the HMD 60. In FIG. 33, the HMD 60 includes a pair of a front 60a and a temple 60b on each of the left and right, which are approximately symmetrically arranged. The front 60a can include, for example, a light guide plate 61. An optical system, a control device, and the like, can be incorporated in the temple 60b.

FIG. 34 is an illustration of a configuration of a part of the HMD 60. Although the configuration for the left eye is illustrated in FIG. 34, the HMD 60 has a configuration similar to that for the right eye.

The HMD 60 includes a control device 11, a light source unit 530, a light-intensity adjuster 507, a movable device 13 including a reflecting surface 14, a light guide plate 61, and a semi-reflective mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507. Then, the adjusted light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 reflects the scanning light on the inner wall and guides the scanning light to the semi-reflective mirror 62. The light guide plate 61 is formed by, for example, resin that has transparency to the wavelength of the scanning light.

The semi-reflective mirror 62 reflects the light that is guided through the light guide plate 61 to the rear side of the HMD 60, and the reflected light exits towards an eye of a wearer 63 of the HMD 60. The semi-reflective mirror 62 has, for example, a free-form surface shape. An image formed of the scanning light is reflected by the semi-reflective mirror 62, thus being formed on the retina of wearer 63. Alternatively, the reflection at the semi-reflective mirror 62 and the effect of the crystalline lenses of eyeballs causes the image of the scanning light to be formed on the retina of the wearer 63. Moreover, due to the reflection at the semi-reflective mirror 62, the spatial distortion of the image is corrected. The wearer 63 can observe an image formed by the light of scanning in the XY direction.

The wearer 63 observes an image of external light superposed on the image of the scanning light because of the semi-reflective mirror 62. The semi-reflective mirror 62 may be replaced with a mirror to exclude the extraneous light. In such a configuration, only the image that is formed by scanning light can be observed.

As described above, the HMD incorporating the movable device 13 according to at least one embodiment achieves a reduction in resonance frequency due to upsizing of the movable portion and enables optical scanning with a higher accuracy.

Figure 35:
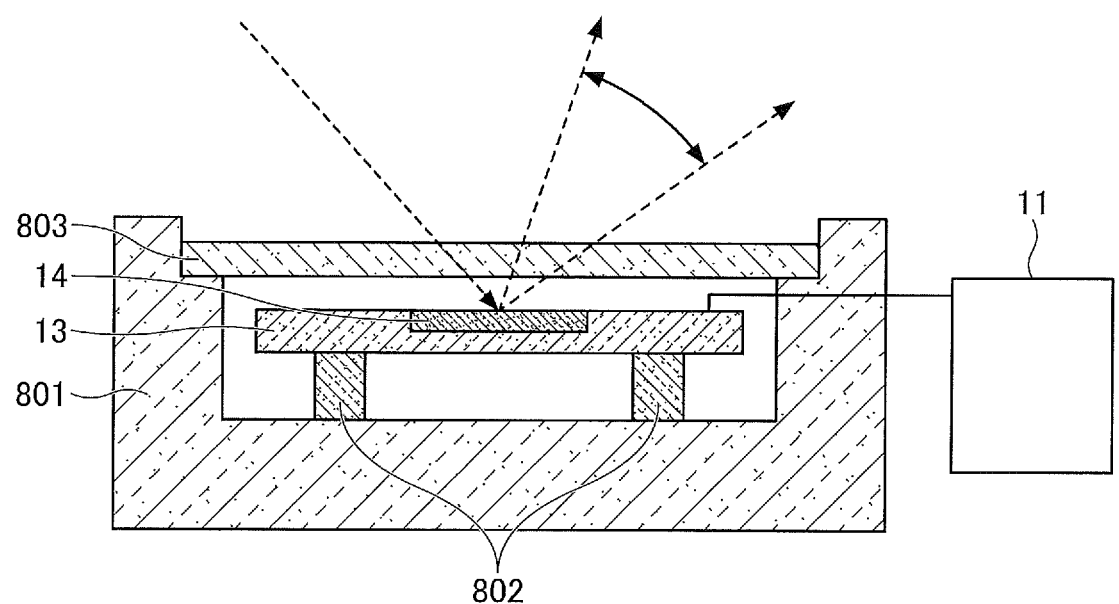
FIG. 35 is a schematic view of an example of a packaged movable device.

Next, packaging of the movable device 13 according to the embodiment is described referring to FIG. 35.

FIG. 35 is a schematic view of an example of a packaged movable device 13.

As illustrated in FIG. 35, the movable device 13 is mounted on a mounting component 802 inside the package 801, and is hermetically sealed and packaged as a part of the package 801 is covered with a light transmission member 803. The package contains inert gas such as nitrogen and is sealed. This configuration can substantially prevent the deterioration of the movable device 13 due to oxidation, and increase the durability against changes in environment such as temperature.

Although the embodiments of the present disclosure have been described above, the present disclosure is not limited to such specific embodiments, and various modifications and changes can be made without departing from the spirit and scope of the present disclosure as set forth in the appended claims.

In the above-described embodiments, the movable portion includes the reflecting surface. However, no limitation is intended thereby, and the movable portion may include another optical element such as a diffraction grating, a photodiode, a heater (for example, a heater using SiN), and a light source (for example, a surface-emitting laser), or may include both the reflecting surface and another optical element.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A light deflector comprising:
a movable member;
a support having one end connected to the movable member to elastically support the movable member;
a drive beam connected to another end of the support to deform the support to cause the movable member to oscillate about an oscillation axis;
a connector disposed between the another end of the support and the drive beam; and
a support frame supporting the drive beam via a fixing member, wherein
the support includes a first support and a second support, the second support having a thickness larger than a thickness of the first support in a first direction perpendicular to the oscillation axis, the second support having a width smaller than a width of the first support in a second direction perpendicular to the oscillation axis, the first direction being different from the second direction.

2. The light deflector according to claim 1,
wherein the connector includes a first connector and a second connector, the second connector having a thickness larger than a thickness of the first connector, the second connector being connected to the second support, and
wherein the drive beam includes a first drive beam portion and a second drive beam, the second drive beam having a thickness larger than a thickness of the first drive beam, the second drive beam being connected to the second connector.

3. The light deflector according to claim 1,
wherein the movable member includes a first movable member and a second movable member, the second movable member having a thickness larger than a thickness of the first movable member, the second movable member being connected to the second support.

4. The light deflector according to claim 1,
wherein the second connector extends toward the fixing member.

5. The light deflector according to claim 4,
wherein the second connector has a first width and a second width along the oscillation axis, the first width being larger than the second width such that the second connector becomes wider toward the support.

6. An image projection apparatus comprising:
a light source unit to emit light;
the light deflector according to claim 1 to deflect the light emitted from the light source unit; and
an optical system to form an image with the light deflected by the light deflector and project the image.

7. The image projection apparatus according to claim 6,
wherein the light source unit includes:
multiple light sources to emit light beams having different wavelengths; and
a combiner to combine the light beams emitted from the multiple light sources into one light beam to be deflected by the light deflector and projected by the image projection apparatus.

8. The image projection apparatus according to claim 7,
wherein the image projection apparatus is a head-up display.

9. A laser headlamp comprising:
a light source to emit light;
the light deflector according to claim 1 to deflect the light emitted from the light source; and
a transparent plate having a surface covered with fluorescent material, the transparent plate to transmit the light deflected by the light deflector to convert the light transmitted through the transparent plate into white light and allow the white light to be emitted therefrom.

10. A head-mounted display comprising:
a light source to emit light;
the light deflector according to claim 1 to deflect the light emitted from the light source;
a light guide plate to guide the light deflected by the light deflector; and
a mirror to reflect the light guided by the light guide plate to eyes of a user wearing the head-mounted display to allow the user to observe an image formed with the light.

11. A distance measurement apparatus comprising:
a light source to emit light;
the light deflector according to claim 1 to deflect the light emitted from the light source to irradiate an object with the deflected light;
a photosensor to receive light reflected from the object; and
circuitry to obtain output based on the received light from the photosensor and calculate a distance to the object based on the output.

12. A mobile object comprising the image projection apparatus according to claim 8.

13. A mobile object comprising the laser headlamp according to claim 9.

14. A mobile object comprising the distance measurement apparatus according to claim 11.

15. The light deflector according to claim 1,
wherein the first support is a silicon active layer, and wherein the second support is disposed below the silicon active layer.

* * * * *